US00RE49401E

(19) United States
(12) Reissued Patent
Iwashita et al.

(10) Patent Number: US RE49,401 E
(45) Date of Reissued Patent: Jan. 31, 2023

(54) RADIATION IMAGING APPARATUS AND RADIATION IMAGING SYSTEM

(71) Applicant: CANON KABUSHIKI KAISHA, Tokyo (JP)

(72) Inventors: Atsushi Iwashita, Saitama (JP); Toshio Kameshima, Kumagaya (JP); Tomoyuki Yagi, Honjo (JP); Katsuro Takenaka, Honjo (JP); Hideyuki Okada, Honjo (JP); Sho Sato, Saitama (JP); Eriko Sato, Tokyo (JP); Takuya Ryu, Kokubunji (JP)

(73) Assignee: Canon Kabushiki Kaisha, Tokyo (JP)

(21) Appl. No.: 16/103,150

(22) Filed: Aug. 14, 2018

Related U.S. Patent Documents

Reissue of:
(64) Patent No.: 9,470,800
Issued: Oct. 18, 2016
Appl. No.: 14/189,229
Filed: Feb. 25, 2014

(30) Foreign Application Priority Data

Feb. 28, 2013 (JP) ..... 2013-040030

(51) Int. Cl.
*H01L 27/146* (2006.01)
*G01T 1/16* (2006.01)
*H04N 5/32* (2006.01)

(52) U.S. Cl.
CPC ..... *G01T 1/16* (2013.01); *H04N 5/32* (2013.01); *H04N 5/3205* (2013.01)

(58) Field of Classification Search
CPC ..... G01T 1/16; H04N 5/32; H04N 5/3205
See application file for complete search history.

(56) References Cited

U.S. PATENT DOCUMENTS 6,797,960 B1 9/2004 Spartiotis et al.
6,801,598 B2 10/2004 Tashiro et al.
(Continued)

FOREIGN PATENT DOCUMENTS

JP 2000-183320 6/2000
JP 2000-183320 A 6/2000
(Continued)

OTHER PUBLICATIONS

Translation of WO 2011/104991 to Nakano.*
(Continued)

*Primary Examiner* — Deandra M Hughes
(74) *Attorney, Agent, or Firm* — Venable LLP

(57) ABSTRACT

A radiation imaging apparatus includes a pixel array having pixels including conversion elements and switching elements, a bias line for supplying a bias potential to the conversion elements; driving lines for supplying a signal to control the switching elements, a driving unit for performing an initialization operation of supplying a driving signal to each driving line group, switching each driving signal from an OFF voltage to an ON voltage, and then returning the driving signal to the OFF voltage; an acquisition unit configured to acquire a plurality of times in each driving cycle a signal value representing a current flowing through the bias line; a calculation unit configured to calculate radiation information based on the signal values; and a determination unit configured to determine whether irradiation of the pixel array with radiation is present based on the radiation information.

66 Claims, 22 Drawing Sheets

(56) References Cited

U.S. PATENT DOCUMENTS

| | | | | |
|---|---|---|---|---|
| 6,952,015 | B2 | 10/2005 | Kameshima | |
| 7,002,157 | B2 | 2/2006 | Kameshima | |
| 7,138,639 | B2 | 11/2006 | Kameshima | |
| 7,379,615 | B2 * | 5/2008 | Allouche | G06T 5/002 378/4 |
| 7,381,963 | B2 | 6/2008 | Endo et al. | |
| 7,386,089 | B2 | 6/2008 | Endo et al. | |
| 7,408,167 | B1 | 8/2008 | Kameshima et al. | |
| 7,421,063 | B2 | 9/2008 | Takenaka et al. | |
| 7,476,027 | B2 | 1/2009 | Takenaka et al. | |
| 7,491,960 | B2 | 2/2009 | Takenaka et al. | |
| 7,514,663 | B2 | 4/2009 | Yagi et al. | |
| 7,514,690 | B2 | 4/2009 | Endo et al. | |
| 7,541,591 | B2 | 6/2009 | Endo et al. | |
| 7,564,038 | B2 | 7/2009 | Endo et al. | |
| 7,573,038 | B2 | 8/2009 | Yokoyama et al. | |
| 7,573,041 | B2 | 8/2009 | Kameshima et al. | |
| 7,592,599 | B2 | 9/2009 | Kameshima | |
| 7,613,277 | B2 | 11/2009 | Takenaka et al. | |
| 7,645,995 | B2 | 1/2010 | Yagi et al. | |
| 7,683,337 | B2 | 3/2010 | Takenaka et al. | |
| 7,705,911 | B2 | 4/2010 | Kameshima | |
| 7,724,874 | B2 | 5/2010 | Kameshima et al. | |
| 7,732,776 | B2 | 6/2010 | Takenaka et al. | |
| 7,732,778 | B2 | 6/2010 | Yokoyama et al. | |
| 7,786,448 | B2 | 8/2010 | Endo et al. | |
| 7,791,034 | B2 | 9/2010 | Kameshima et al. | |
| 7,839,977 | B2 | 11/2010 | Kameshima et al. | |
| 7,850,367 | B2 | 12/2010 | Takenaka et al. | |
| 7,872,218 | B2 | 1/2011 | Endo et al. | |
| 7,880,145 | B2 | 2/2011 | Yagi et al. | |
| 7,923,696 | B2 | 4/2011 | Kameshima | |
| 7,965,817 | B2 | 6/2011 | Kameshima et al. | |
| 7,989,772 | B2 | 8/2011 | Yagi et al. | |
| 8,093,562 | B2 | 1/2012 | Yokoyama et al. | |
| 8,107,588 | B2 | 1/2012 | Kameshima et al. | |
| 8,167,486 | B2 | 5/2012 | Takenaka et al. | |
| 8,218,070 | B2 | 7/2012 | Kameshima | |
| 8,222,611 | B2 | 7/2012 | Yagi et al. | |
| 8,247,779 | B2 | 8/2012 | Kameshima et al. | |
| 8,642,970 | B2 | 2/2014 | Iwakiri et al. | |
| 8,723,996 | B2 | 5/2014 | Yokoyama et al. | |
| 8,872,118 | B2 | 10/2014 | Nishino et al. | |
| 8,894,280 | B2 * | 11/2014 | Topfer | A61B 6/585 250/252.1 |
| 9,128,162 | B2 * | 9/2015 | Greening | H01M 10/48 |
| 9,128,196 | B2 | 9/2015 | Sato et al. | |
| 9,423,512 | B2 | 8/2016 | Sato et al. | |
| 9,468,414 | B2 * | 10/2016 | Ryu | A61B 6/42 |
| 9,541,653 | B2 | 1/2017 | Iwashita et al. | |
| 2003/0086523 | A1 | 5/2003 | Tashiro et al. | |
| 2005/0128327 | A1 | 6/2005 | Bencuya et al. | |
| 2008/0083876 | A1 | 4/2008 | Endo et al. | |
| 2009/0256079 | A1 | 10/2009 | Endo et al. | |
| 2009/0272909 | A1 | 11/2009 | Takenaka et al. | |
| 2010/0155576 | A1 | 6/2010 | Merrill | |
| 2010/0277623 | A1 | 11/2010 | Tejada et al. | |
| 2011/0032392 | A1 | 2/2011 | Litvinov et al. | |
| 2011/0309262 | A1 | 12/2011 | Sato et al. | |
| 2011/0317054 | A1 | 12/2011 | Kameshima et al. | |
| 2012/0132820 | A1 | 5/2012 | Iwakiri et al. | |
| 2012/0132824 | A1 | 5/2012 | Nishino et al. | |
| 2012/0132825 | A1 | 5/2012 | Amitani et al. | |
| 2013/0051525 | A1 | 2/2013 | Sato | |
| 2013/0140467 | A1 | 6/2013 | Kitano et al. | |
| 2013/0240712 | A1 | 9/2013 | Takenaka et al. | |
| 2013/0264488 | A1 | 10/2013 | Sugawara et al. | |
| 2013/0264490 | A1 | 10/2013 | Takenaka et al. | |
| 2014/0061491 | A1 | 3/2014 | Iwashita et al. | |
| 2014/0112448 | A1 | 4/2014 | Takenaka et al. | |
| 2014/0185764 | A1 | 7/2014 | Takenaka et al. | |
| 2014/0239186 | A1 | 8/2014 | Sato et al. | |
| 2014/0239187 | A1 | 8/2014 | Iwashita et al. | |
| 2014/0241501 | A1 | 8/2014 | Sato et al. | |
| 2014/0241502 | A1 | 8/2014 | Kitano et al. | |
| 2014/0361189 | A1 | 12/2014 | Kameshima et al. | |
| 2015/0085980 | A1 | 3/2015 | Kitano et al. | |

FOREIGN PATENT DOCUMENTS

| | | | |
|---|---|---|---|
| JP | 2002-543684 | | 12/2002 |
| JP | 2002-543684 | A | 12/2002 |
| JP | 2003-000576 | | 1/2003 |
| JP | 2003-576 | A | 1/2003 |
| JP | 2003-126072 | | 5/2003 |
| JP | 2003-126072 | A | 5/2003 |
| JP | 2004-130058 | | 4/2004 |
| JP | 2004-130058 | A | 4/2004 |
| JP | 2008-086000 | | 4/2008 |
| JP | 2008-86000 | A | 4/2008 |
| JP | 2009-219538 | | 10/2009 |
| JP | 2009-219538 | A | 10/2009 |
| JP | 2010-264085 | | 11/2010 |
| JP | 2010-264085 | A | 11/2010 |
| JP | 2010-268171 | | 11/2010 |
| JP | 2010-268171 | A | 11/2010 |
| JP | 2011-185622 | | 9/2011 |
| JP | 2011-185622 | A | 9/2011 |
| JP | 2012-129983 | | 7/2012 |
| JP | 2012-129983 | A | 7/2012 |
| JP | 2012-129984 | | 7/2012 |
| JP | 2012-129984 | A | 7/2012 |
| WO | 00/065825 | | 11/2000 |
| WO | WO 00/65825 | A1 | 11/2000 |
| WO | 2011/104991 | | 9/2011 |
| WO | WO 2011/104991 | A | 9/2011 |
| WO | 2012/008229 | | 1/2012 |
| WO | WO 20121008229 | A1 | 1/2012 |

OTHER PUBLICATIONS

European Extended Search Report issued May 11, 2015 in counterpart application 14157067.1.
Extended European Search Report in counterpart EP 14157069.7 dated Jun. 12, 2015 (8 pages).
U.S. Appl. No. 14/189,266, filed Feb. 25, 2014, Eriko Sato.
U.S. Appl. No. 14/189,281, filed Feb. 25, 2014, Atsushi Iwashita.
U.S. Appl. No. 14/189,249, filed Feb. 25, 2014, Eriko Sato.
U.S. Appl. No. 14/211,970, filed Mar. 14, 2014, Takuya Ryu.
U.S. Appl. No. 14/290,479, filed May 29, 2014, Toshio Kameshima.
U.S. Appl. No. 14/292,230, filed May 30, 2014, Sho Sato.

* cited by examiner

RADIATION IMAGING APPARATUS AND RADIATION IMAGING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present disclosure relates to a radiation imaging apparatus and radiation imaging system.

2. Description of the Related Art

There has been proposed an arrangement in which a radiation imaging apparatus detects the presence/absence of irradiation with radiation to synchronize a radiation generating apparatus and the radiation imaging apparatus. Japanese Patent Laid-Open No. 2002-543684 has proposed a radiation imaging apparatus which detects the presence/absence of irradiation with radiation by using the fact that when the radiation imaging apparatus is irradiated with radiation, a current flows through a bias line which supplies a bias potential to pixels. More specifically, when a current flowing through the bias line exceeds a predetermined threshold, it is determined that the radiation imaging apparatus has been irradiated with radiation. In addition to a current arising from radiation, a noise current flows through the bias line owing to various factors. When the noise current is large, it may be erroneously detected that the radiation imaging apparatus has been irradiated with radiation though it is not actually irradiated with radiation. To prevent the detection error, in the above-mentioned reference, a sample and hold circuit is arranged to hold a dark current flowing through the bias line. A value obtained by subtracting the held dark current from a current flowing through the bias line at a certain time point is compared with a threshold.

SUMMARY OF THE INVENTION

According to an embodiment, a radiation imaging apparatus comprises: a pixel array having a plurality of pixels arranged in a plurality of rows and a plurality of columns, each pixel including a conversion element for accumulating charge in accordance with radiation and a switching element for connecting the conversion element to a signal line; a bias line for supplying a bias potential to the conversion elements of the plurality of pixels; a plurality of driving lines for supplying a driving signal to control the switching elements of the plurality of pixels; a driving unit for performing at least once an initialization operation comprising supplying a driving signal to each of a plurality of driving line groups each group including at least one driving line, switching each driving signal from an OFF voltage at which the switching element is turned off, to an ON voltage at which the switching element is turned on, and then returning the driving signal to the OFF voltage; an acquisition unit configured to acquire a plurality of times in each driving cycle a signal value representing a current flowing through the bias line, the driving cycle being a time duration from the time when a driving signal to a particular driving line group is switched to the ON voltage to the time when a driving signal to a next driving line group is switched to the ON voltage; a calculation unit configured to calculate radiation information based on a plurality of acquired signal values; and a determination unit configured to determine whether irradiation of the pixel array with radiation is present based on the calculated radiation information.

Further features of the present invention will become apparent from the following description of exemplary embodiments (with reference to the attached drawings).

DESCRIPTION OF THE EMBODIMENTS

Figure 1:
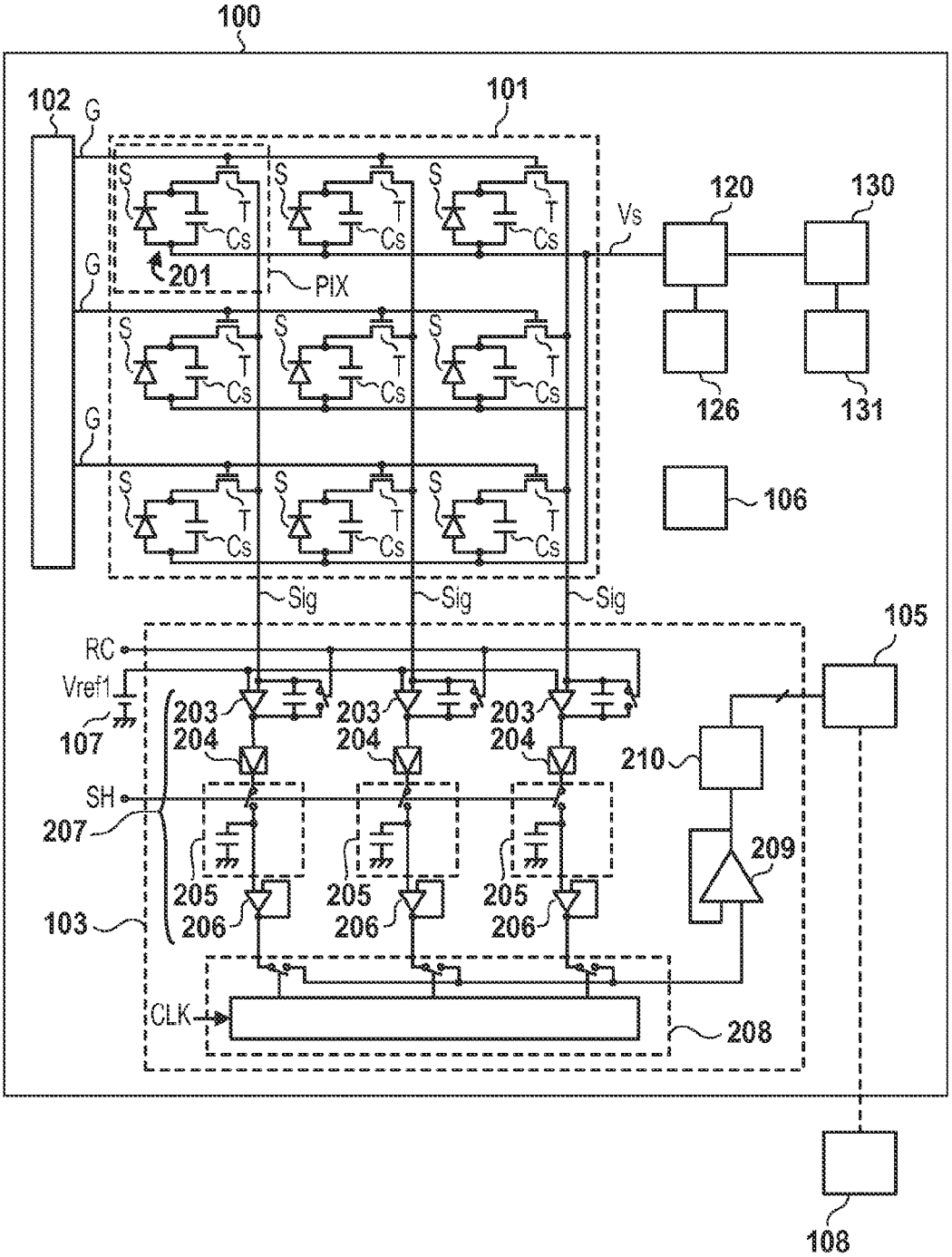
FIG. 1 is a circuit diagram for explaining an example of the arrangement of a radiation imaging apparatus according to some embodiments.

The method of subtracting a dark current, as proposed in Japanese Patent Laid-Open No. 2002-543684, can reduce only noise of a very low frequency component (for example, 1 Hz or lower), like the temperature drift of a bias current. Thus, this method cannot cope with a detection error generated by noise (50 to 60 Hz) mixed from a commercial power supply or noise (several Hz to several kHz) generated when a pressure or shock is applied to a housing. One aspect of the present invention therefore provides a technique for suppressing a detection error in determination of whether a radiation imaging apparatus has been irradiated with radiation.

Embodiments of the present invention will be described below with reference to the accompanying drawings. The same reference numerals denote the same parts throughout various embodiments, and a repetitive description thereof will be omitted. The embodiments can be appropriately changed and combined.

The overall arrangement of a radiation imaging apparatus 100 according to some embodiments of the present invention will be explained with reference to FIG. 1. The radiation imaging apparatus 100 is configured to capture an image formed by radiation. The image can be formed by radiation which has been emitted by a radiation source (not shown) and has passed through an object. The radiation can be, for example, an X-ray, α-ray, β-ray, or γ-ray.

The radiation imaging apparatus 100 includes a pixel array 101, driving circuit (driving unit) 102, readout circuit 103, detection circuit 120, reference bias potential generation circuit 126, control unit 106, calculation unit 130, and determination unit 131. In addition, the radiation imaging apparatus 100 can include a signal processing unit (processor) 105.

The pixel array 101 includes a plurality of pixels PIX which are arranged two-dimensionally to constitute a plurality of rows and a plurality of columns. In an example shown in FIG. 1, the pixels PIX are arranged to constitute three rows and three columns. In practice, a larger number of pixels PIX are arranged to constitute a larger number of rows and a larger number of columns. For example, for a 17-inch radiation imaging apparatus, pixels of about 2,800 rows and about 2,800 columns are arranged. Each pixel PIX includes a conversion element 201 which converts radiation or light into charges, and a switching element T which outputs an electrical signal corresponding to the charges to a signal line Sig. The pixel PIX is configured to detect radiation.

The conversion element 201 can be, for example, an indirect conversion element including a photoelectric conversion element S which converts light into charges, and a wavelength converter (scintillator) which converts radiation into light of a wavelength detectable by the photoelectric conversion element. Alternatively, the conversion element 201 can be a direct conversion element which directly converts radiation into charges. The photoelectric conversion element S can be, for example, a PIN photodiode which is mainly made of amorphous silicon and arranged on an insulating substrate such as a glass substrate. When the photoelectric conversion element of the conversion element 201 is a PIN photodiode, the conversion element 201 can have a capacitor Cs.

The switching element T can be a transistor having a control terminal and two main terminals, for example, a thin film transistor (TFT). One electrode of the conversion element 201 is electrically connected to one of the two main terminals of the switching element T. The other electrode of the conversion element 201 is electrically connected to a common bias line Vs. The detection circuit 120 supplies a bias potential VVs to the bias line Vs.

The control terminal (gate) of the switching element T is connected to a driving line G which is driven by the driving circuit 102. The driving circuit 102 drives, to the active level, the driving line G of a row to be selected in the pixel array 101. When an active-level driving signal is supplied to the gates of the switching elements T via the driving line G, the switching element T is turned on. In response to this, signals corresponding to charges accumulated in the conversion elements 201 of the pixels PIX on the selected row are output in parallel to a plurality of signal lines Sig.

The readout circuit 103 reads out the signals output to the signal lines Sig. The readout circuit 103 includes a plurality of amplifier circuits 207 and a multiplexer 208. The amplifier circuits 207 are arranged so that one amplifier circuit 207 corresponds to one signal line Sig. The amplifier circuits 207 amplify in parallel the signals output in parallel from the pixels PIX on the selected row to the plurality of signal lines Sig.

Each amplifier circuit 207 can include, for example, an integrating amplifier 203, a variable amplifier 204 which amplifies a signal from the integrating amplifier 203, a sample and hold circuit 205 which samples and holds a signal from the variable amplifier 204, and a buffer amplifier 206. The integrating amplifier 203 can include, for example, an operational amplifier which amplifies a difference between a signal output to the signal line Sig and a reference potential Vref1 from a reference power supply 107, an integrating capacitor, and a reset switch. The amplification factor of the integrating amplifier 203 can be changed by changing the value of the integrating capacitor. The inverting input terminal of the operational amplifier receives a signal output to the signal line Sig, its non-inverting input terminal receives the reference voltage Vref1 from the reference power supply 107, and its output terminal is connected to the input terminal of the variable amplifier 204. The integrating capacitor and reset switch are parallel-connected between the inverting input terminal and output terminal of the operational amplifier. The sample and hold circuit 205 can be constructed by, for example, a sampling switch and sampling capacitor.

The multiplexer 208 sequentially selects and outputs, in parallel, signals read out from the plurality of amplifier circuits 207 corresponding to the respective signal lines Sig. The readout circuit 103 can include a buffer amplifier 209 which buffers a signal from the multiplexer 208. The buffer amplifier 209 can function as an impedance converter. The readout circuit 103 can include an A/D converter 210. For example, the A/D converter 210 can be arranged to convert an analog signal output from the buffer amplifier 209 into a digital signal.

A signal output from the readout circuit 103 can be provided to the signal processing unit 105. The signal processing unit 105 can be configured to process a signal output from the readout circuit 103 and supply it to a computer 108. The signal processing unit 105 may be incorporated in the radiation imaging apparatus 100, as shown in FIG. 1, or provided as an external apparatus outside the radiation imaging apparatus 100.

The control unit 106 controls the overall operation of the radiation imaging apparatus 100 and generates, for example, a control signal for controlling the driving circuit 102 and a control signal for controlling the readout circuit 103. FIG. 1 does not show lines representing connections from the control unit 106 to the respective circuits. In accordance with a control signal from the control unit 106, the driving circuit 102 turns on the switching elements T of the pixels PIX on a row from which signals should be read out. Control signals for controlling the readout circuit 103 can include, for example, a reset signal RC, sample and hold signal SH, and clock signal CLK. The reset signal RC is a signal which controls the reset switch of the integrating amplifier 203. The sample and hold signal SH is a signal which controls the sample and hold circuit 205. The clock signal CLK is a signal which controls the multiplexer 208.

Figure 2:
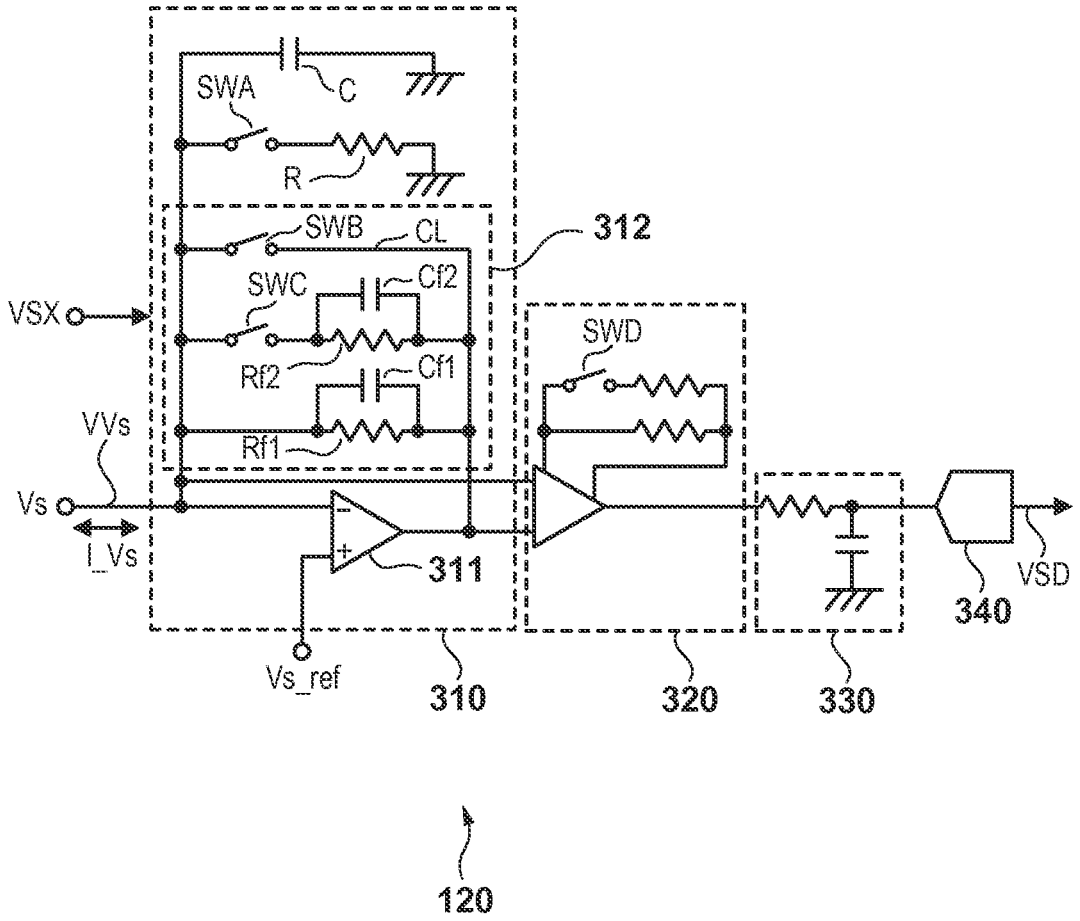
FIG. 2 is a circuit diagram for explaining an example of the arrangement of a detection circuit in FIG. 1.

The detection circuit 120 will be explained with reference to FIG. 2. The detection circuit 120 detects a current (to be referred to as a bias current hereinafter) flowing through the bias line Vs, and provides, to the calculation unit 130, a bias current signal VSD representing this current. That is, the detection circuit 120 can function as an acquisition unit which acquires the bias current signal VSD. The detection circuit 120 can include, for example, a current-to-voltage conversion amplifier 310, voltage amplifier 320, filter circuit 330, and A/D converter 340. The current-to-voltage conversion amplifier 310 converts a current flowing through the bias line Vs into a voltage. The voltage amplifier 320 amplifies a signal (voltage signal) output from the current-to-voltage conversion amplifier 310. The voltage amplifier 320 can be constructed by, for example, an instrumentation amplifier. The filter circuit 330 is a filter which limits the band of a signal output from the voltage amplifier 320, and can be, for example, a low-pass filter. The A/D converter 340 supplies, to the calculation unit 130, the bias current signal VSD obtained by converting a signal (analog signal) output from the filter circuit 330 into a digital signal value.

The detection circuit 120, more specifically, the current-to-voltage conversion amplifier 310 detects a current flowing through the bias line Vs, and supplies, to the bias line Vs, a potential corresponding to a reference bias potential Vs_ref supplied from the reference bias potential generation circuit 126. The current-to-voltage conversion amplifier 310 can be a transimpedance amplifier. The current-to-voltage conversion amplifier 310 includes, for example, an operational amplifier 311, and a feedback path 312 which is interposed between the inverting input terminal (second input terminal) and output terminal of the operational amplifier 311. The non-inverting input terminal (first input terminal) of the operational amplifier 311 receives the reference bias potential Vs_ref. The feedback path of the operational amplifier 311 can include the first path on which the inverting input terminal and output terminal are shorted by a resistor Rf1, the second path on which the inverting input terminal and output terminal are shorted by a resistor Rf2, and the third path on which the inverting input terminal and output terminal are shorted by a conductive line CL.

A phase compensating capacitor Cf1 can be parallel-connected to the resistor Rf1. A phase compensating capacitor Cf2 can be parallel-connected to the resistor Rf2. The phase compensating capacitors Cf1 and Cf2 are effective for preventing, for example, oscillation of the current-to-voltage conversion amplifier 310. A switch SWC can be series-inserted in the path including the resistor Rf2. A switch SWB can be series-inserted in the path constructed by the conductive line CL.

The control unit 106 controls the feedback impedance by supplying a control signal VSX to the detection circuit 120 to select a path to be enabled from a plurality of paths including the first, second, and third paths. When the switch SWB is closed, the third path constructed by the conductive line CL is enabled, and the first path including the resistor Rf1 and the second path including the resistor Rf2 are disabled. When the switch SWB is opened and the switch SWC is closed, the third path is disabled, and the first and second paths are enabled.

A switch SWA and resistor R may be series-interposed between the inverting input terminal of the operational amplifier 311 and ground. A capacitor C may be interposed between the inverting input terminal of the operational amplifier 311 and ground. The current-to-voltage conversion amplifier 310 has the feedback path 312 and functions to generate, at the inverting input terminal (second input terminal) of the operational amplifier 311, a potential corresponding to the reference bias potential Vs_ref supplied to its non-inverting input terminal (first input terminal). More specifically, the current-to-voltage conversion amplifier 310 functions to generate, at the inverting input terminal of a differential amplifier circuit 211, almost the same potential as the reference bias potential Vs_ref supplied to its non-inverting input terminal. The control unit 106 controls the impedance (to be referred to as feedback impedance hereinafter) of the feedback path 312 of the current-to-voltage conversion amplifier 310.

A high feedback impedance means a large gain of the current-to-voltage conversion amplifier 310. When the feedback impedance is high, it limits the magnitude of a bias current IVs, and the potential of the bias line Vs may become unstable. To prevent this, the feedback impedance is controlled in accordance with the operation of the radiation imaging apparatus 100 such as a detection operation of detecting irradiation of the pixel array 101 with radiation, and an operation of reading out a signal from the pixel PIX. This will be explained in more detail.

In the embodiment, the calculation unit 130 calculates radiation information based on an output from the detection circuit 120, that is, the bias current signal VSD. Based on the radiation information, the determination unit 131 detects the start of irradiation of the pixel array 101 with radiation. In response to the detection, the control unit 106 controls the charge accumulation operation by the plurality of pixels PIX. That is, to quickly detect the start of irradiation of the pixel array 101 with radiation, the detection circuit 120 needs to detect, at high sensitivity, a current flowing through the bias line Vs. For this purpose, the feedback impedance is increased in the detection operation of detecting irradiation of the pixel array 101 with radiation.

In contrast, if the feedback impedance is high when transferring charges accumulated in the capacitor Cs of the conversion element 201 to the signal line Sig via the switching element T, current supply via the bias line Vs to a second electrode s2 of the conversion element 201 becomes slow. Especially when radiation entering the pixel array 101 is locally strong, noise is readily generated in a captured image owing to a delay of current supply via the bias line Vs to the second electrode s2 of the conversion element 201. To prevent this, when transferring charges accumulated in the capacitor Cs of the conversion element 201 to the signal line Sig via the switching element T, the feedback impedance is decreased.

The control unit 106 controls the feedback impedance so that the feedback impedance in the detection operation of detecting irradiation with radiation becomes higher than that in the operation of reading out a signal from the pixel PIX. A case in which the value of the resistor Rf2 is smaller than that of the resistor Rf1 will be exemplified. In this case, when the second path including the resistor Rf2 is selected, the gain increases.

For example, the control unit 106 opens the switch SWB in the detection operation of detecting irradiation with radiation, and closes it in the operation of reading out a signal from the pixel PIX. In this case, the state of the switch SWC is arbitrary in both the detection operation of detecting irradiation with radiation and the operation of reading out a signal from the pixel PIX.

Instead, the control unit 106 opens the switch SWB and closes the switch SWC in the detection operation of detecting irradiation with radiation, and closes the switch SWB in the operation of reading out a signal from the pixel PIX (the switch SWC can be opened or closed because the switch SWB is closed).

The switch SWA and resistor R are not essential. However, when the switch SWA and resistor R are arranged, the switch SWA can be closed during the non-operating period of the detection circuit 120, and opened in the detection operation of detecting irradiation with radiation. For example, the non-operating period of the detection circuit 120 can be a period excluding the detection operation of detecting irradiation with radiation, and an accumulation operation and image output operation (to be described later). In the operation of reading out a signal from the pixel PIX, the switch SWA may be closed or opened. At this time, the value of the resistor R may be larger than those of the resistors Rf1 and Rf2. For example, it is possible to set the resistor R to be 10 kΩ, the resistor Rf1 to be 1 kΩ, and the resistor Rf2 to be 1,050Ω.

The voltage amplifier 320 can be constructed as a variable gain amplifier. For example, the gain of the voltage amplifier 320 can be changed by opening or closing a switch SWD.

The operation of the radiation imaging apparatus 100 includes an initialization operation, accumulation operation, and readout operation. The initialization operation is an operation of initializing the plurality of pixels PIX of the pixel array 101 for each row. The accumulation operation is an operation of accumulating charges generated by irradiation with radiation in each pixel PIX of the pixel array 101. The readout operation is an operation of reading out, from the pixel array 101, a signal corresponding to charges accumulated in each pixel PIX of the pixel array 101 by irradiation of the pixel array 101 with radiation, and outputting the signal as an image (image signal).

The operation shifts from the initialization operation to the accumulation operation when the determination unit 131 detects, based on an output from the detection circuit 120, the start of irradiation of the radiation imaging apparatus 100 with radiation. The operation shifts from the accumulation operation to the readout operation in response to, for example, the lapse of a predetermined time after the start of the accumulation operation.

Figure 3:
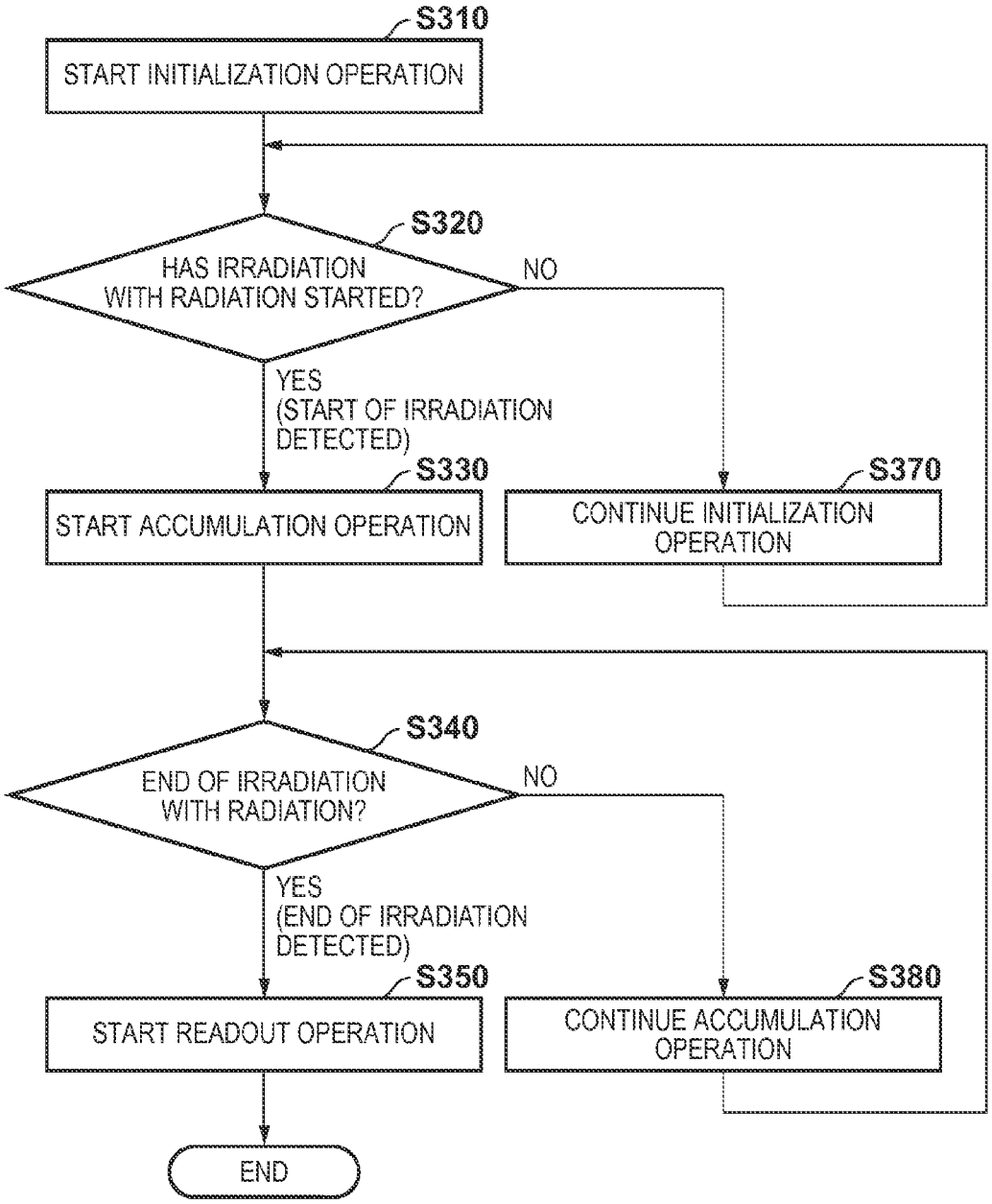
FIG. 3 is a flowchart for explaining an example of the operation of the radiation imaging apparatus in FIG. 1.
Figure 4:
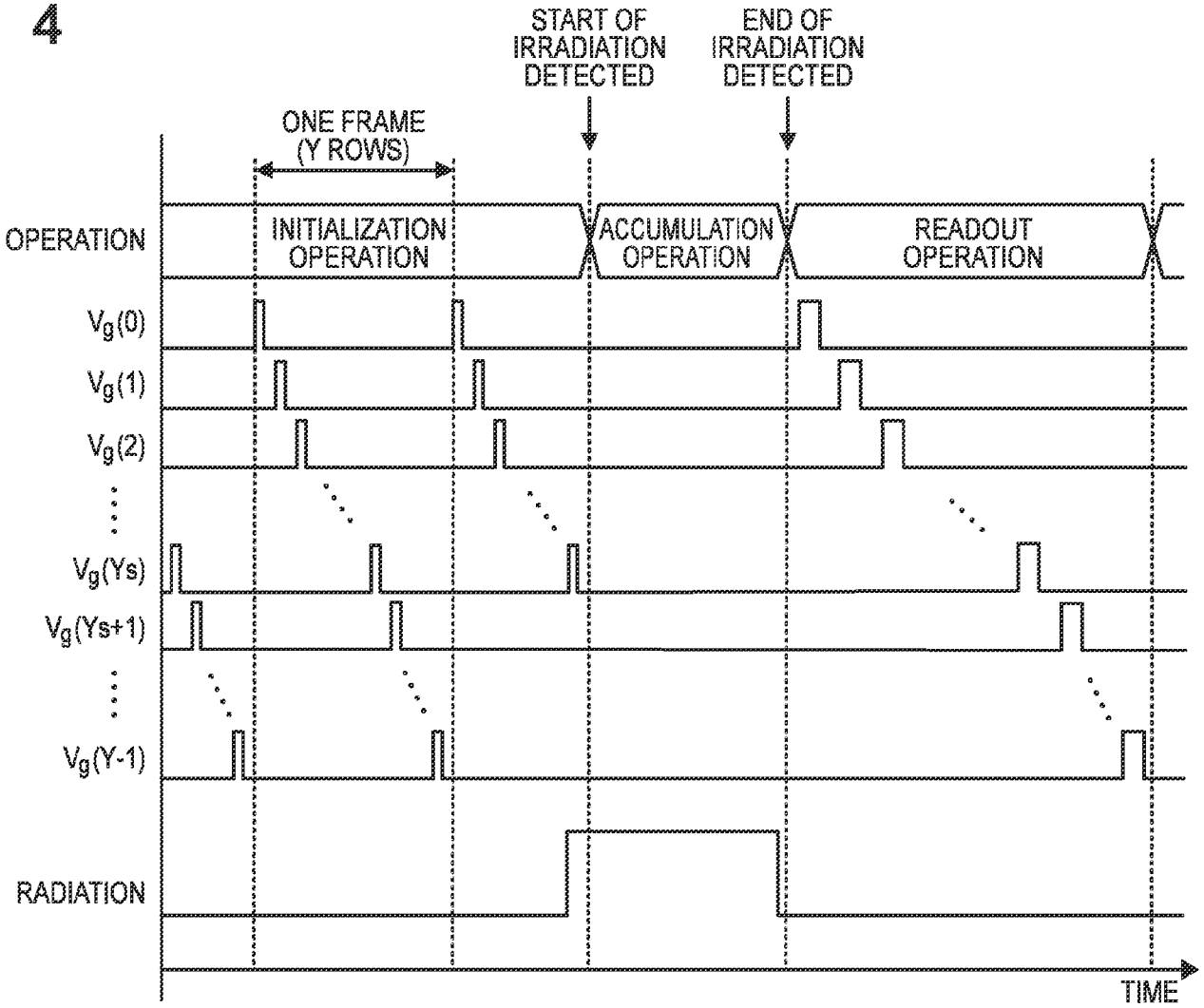
FIG. 4 is a timing chart for explaining an example of the operation of the radiation imaging apparatus in FIG. 1.

The operation of the radiation imaging apparatus 100 will be explained with reference to FIGS. 3 and 4. In step S310, the control unit 106 starts the initialization operation. In the initialization operation, the control unit 106 repeats an operation of changing the driving lines G to the active level sequentially from the first to final rows, and changing the reset signal RC to the active level. When the reset signal RC changes to the active level, the integrating amplifier 203 changes to the voltage follower state, and the reference potential Vref1 is supplied to the signal line Sig. In this state, the switches T on a row on which the driving line G has been changed to the active level are turned on to initialize charges accumulated in the capacitors Cs of the conversion elements 201. In FIG. 4, Vg(0), Vg(1), Vg(2), . . . , Vg(Ys), Vg(Ys+1), . . . , Vg(Y−1) are driving signals supplied to the driving lines G on the first to final rows of the pixel array 101. Y represents the number of rows of the pixel array 101, that is, the number of driving lines G. An operation until an active-level signal is supplied to the next driving line G after the control unit 106 starts supplying an active-level signal to one of the driving lines G will be called one initialization operation. A period until an active-level signal is supplied once to all the driving lines G will be called a frame. In the example of FIG. 4, Y initialization operations are performed in one frame, and the pixels of one row are initialized by one initialization operation.

In the period of the initialization operation, the detection circuit 120 detects information correlated with the radiation dose to the pixel array 101, and supplies a detection signal corresponding to this information to the calculation unit 130. In the embodiment, the detection circuit 120 detects the current I_Vs flowing through the bias line Vs as information correlated with the radiation dose to the pixel array 101, and supplies, to the calculation unit 130, the bias current signal VSD representing this current as a detection signal corresponding to this information.

During the initialization operation, in step S320, the determination unit 131 performs radiation detection processing. More specifically, the calculation unit 130 calculates radiation information based on the bias current signal VSD. Based on the radiation information, the determination unit 131 determines whether irradiation of the pixel array 101 with radiation has been started. In the embodiment, the determination unit 131 performs detection processing once every initialization operation. Alternatively, the determination unit 131 may perform detection processing once every plurality of initialization operations. In this case, the control unit 106 sets the feedback impedance in the detection operation of detecting irradiation with radiation, to be higher than the feedback impedance in the operation of reading out a signal from the pixel PIX.

The control unit 106 continues to repeat the initialization operation until the start of irradiation of the pixel array 101 with radiation is detected (step S370). If the start of irradiation of the pixel array 101 with radiation is detected (YES in step S320), the control unit 106 starts the accumulation operation in step S330. That is, if the start of irradiation with radiation is detected (represented as "start of irradiation detect" in FIG. 4), the operation shifts from the initialization operation to the accumulation operation. Details of the detection processing in step S320 will be described later.

During the accumulation operation, in step S340, the control unit 106 determines whether irradiation with radiation has ended. The radiation end determination method is not particularly limited. For example, when a predetermined time has elapsed after the start of the accumulation operation, it can be determined that irradiation with radiation has ended. Alternatively, the control unit 106 can detect the end of irradiation of the pixel array 101 with radiation based on the bias current signal VSD.

The control unit 106 continues the accumulation operation until it determines that irradiation of the pixel array 101 with radiation has ended (step S380). If the control unit 106 determines that irradiation of the pixel array 101 with radiation has ended (YES in step S340), it starts the readout operation in step S350. That is, if it is determined that irradiation with radiation has ended (represented as "end of irradiation detected" in FIG. 4), the operation shifts from the accumulation operation to the readout operation. In the readout operation, signals are read out sequentially from pixels on the first row of the pixel array 101 to pixels on the final row.

Figure 5:
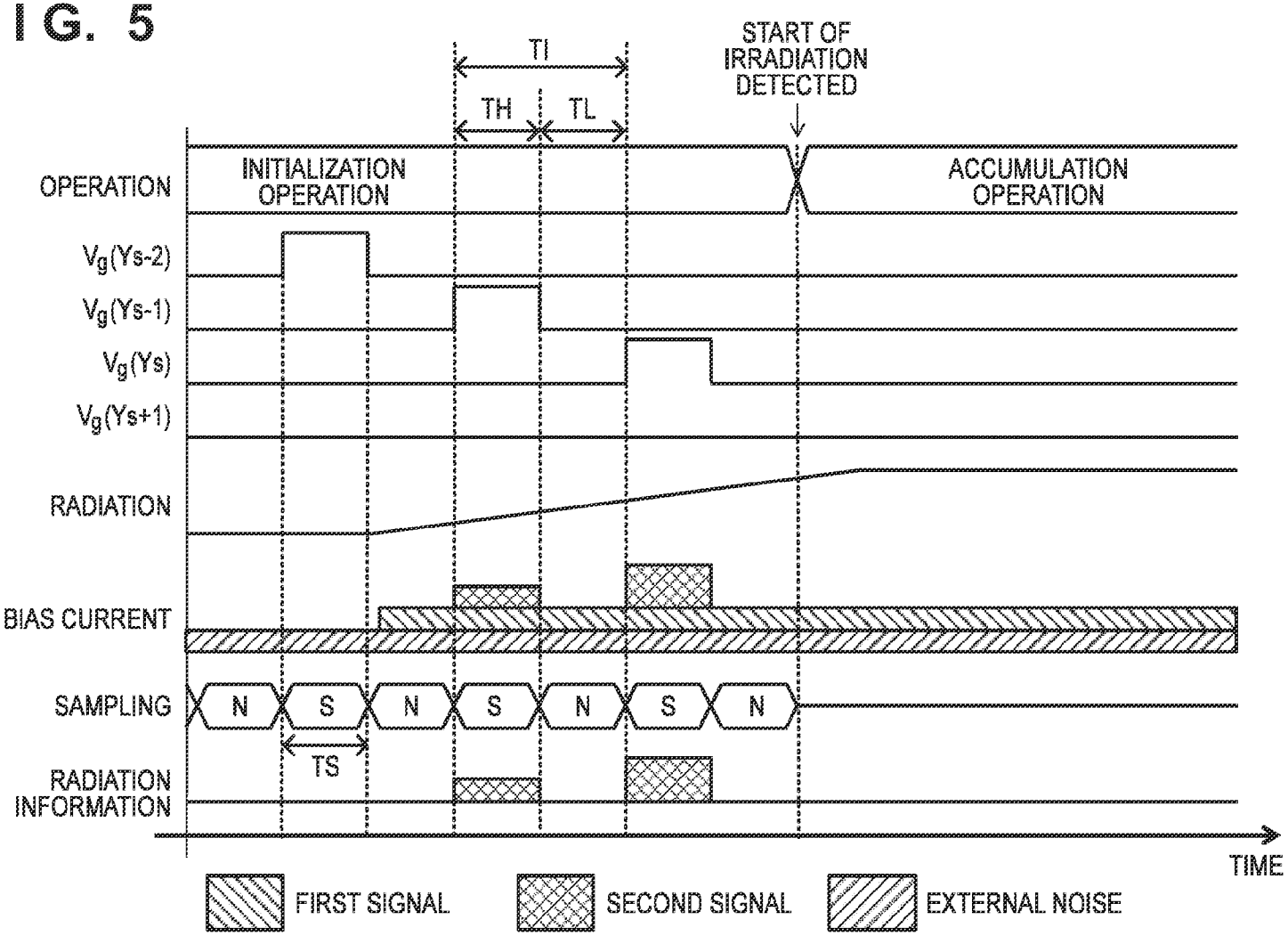
FIG. 5 is a timing chart for explaining an example of the detailed operation of the radiation imaging apparatus in FIG. 1.

FIG. 5 shows an example of the operation of the radiation imaging apparatus 100 when attention is paid to the timing to shift from the initialization operation to the accumulation operation. In FIG. 5, Vg(Ys−2), Vg(Ys−1), Vg(Ys), and Vg(Ys+1) are driving signals supplied to the driving lines G on the (Ys−2)th row to (Ys+1)th row of the pixel array 101. In the embodiment, the switching element T is high active, is turned on when a high-level voltage (ON voltage) is applied to the driving line G, and is turned off when a low-level voltage (OFF voltage) is applied. Instead, the switching element T may be low active.

The radiation imaging apparatus 100 can have the following features in regard to a bias current flowing through the bias line Vs.

(1) During irradiation with radiation, a current proportional to the radiation dose per unit time flows through the bias line Vs. This current is represented as the "first signal" in FIG. 5. This current flows by a larger amount when the switching element T of the pixel PIX is ON, than when it is OFF. In FIG. 5, however, the current is constant for simplicity.

(2) When the switching element T of the pixel PIX irradiated with radiation is turned on, a current proportional to the amount of charges accumulated in the conversion element 201 of the pixel PIX until the switching element T is turned on flows through the bias line Vs. This current is represented as the "second signal" in FIG. 5.

(3) When the ON/OFF state of the switching element T of the pixel PIX is switched, a current flows through the bias line Vs. This current can be called switching noise.

(4) When a shock or magnetic field is applied to the radiation imaging apparatus 100, a current flows through the bias line Vs. This current can be called external noise, and is represented as "external noise" in FIG. 5. For example, a current of about 50 to 60 Hz can flow through the bias line Vs under the influence of an electromagnetic field generated by a commercial power supply. When a shock is applied to the radiation imaging apparatus 100, a current of about several Hz to several kHz can flow through the bias line Vs.

(5) Even if neither a magnetic field nor shock is applied to the radiation imaging apparatus 100, a current flows through the bias line Vs owing to an electromagnetic wave generated by the radiation imaging apparatus 100 itself, internal noise of the detection circuit 120, or the like. This current can be called system noise. The "bias current" in FIG. 5 represents that the first signal, second signal, and external noise are constant over time. However, FIG. 5 only conceptually shows the timings when the first signal, second signal, and external noise appear, and the first signal, second signal, and external noise may or may not, in fact, always be constant over time.

To detect irradiation with radiation, more specifically, the start of irradiation with radiation, the sample value of the bias current signal VSD as a detection signal may be directly used. However, in the embodiment, to reduce the influence of external noise under the influence of a shock or magnetic field or the like, the calculation unit 130 calculates radiation information by processing a plurality of bias current signals VSD, and the determination unit 131 detects irradiation with radiation based on the radiation information. For example, when radiation information or the integral value of radiation information exceeds a predetermined threshold, the determination unit 131 determines that irradiation with radiation has been performed.

As shown in FIG. 5, TI is the driving cycle of the driving circuit 102. That is, the radiation imaging apparatus 100 performs one initialization operation in every time TI. In the time TI, TH is the time (to be referred to as the ON time hereinafter) when the driving circuit 102 supplies a high-level driving signal, and TL is the time (to be referred to as the OFF time hereinafter) when the driving circuit 102 supplies a low-level driving signal. In the embodiment, the control unit 106 controls the driving circuit 102 to set TH=TL. More specifically, at the same time as the start of one initialization operation, the driving circuit 102 switches the driving signal of a certain driving line G from low level to high level, returns it to low level upon the lapse of the time TH, and starts the next initialization operation upon the lapse of the time TL of the same duration. For example, TH=TL=16 μsec can be set. TS is the sampling cycle of the A/D converter 340 of the detection circuit 120. In this case, the detection circuit 120 supplies one sample value of the bias current signal VSD to the calculation unit 130 in every time TS. As shown in FIG. 5, in the embodiment, the detection circuit 120 performs sampling to set TH=TL=TS. In this case, the detection circuit 120 outputs two sample values of the bias current signal VSD in every initialization operation. A sample value output from the detection circuit 120 when the switching element T of the pixel PIX is ON will be called an effective value S. A sample value output from the detection circuit 120 when the switching element T of the pixel PIX is OFF will be called a noise value N. The calculation unit 130 can reduce external noise by calculating the difference between the effective value S and the noise value N, and can extract only the second signal as radiation information.

Since external noise varies over time, the calculation unit 130 may calculate a radiation signal by using an effective value S and noise value N which have been sampled at close times. For example, S(y) and N(y) are an effective value S and noise value N output in the yth (y is an arbitrary natural number) initialization operation, respectively. X(y) is radiation information used by the determination unit 131 in step S320 (FIG. 3) to detect irradiation with radiation in the yth initialization operation. In this case, the calculation unit 130 can calculate X(y) as per:

$$X(y)=S(y)-N(y) \tag{1}$$

$$X(y)=S(y)-N(y-1) \tag{2}$$

$$X(y)=S(y)-\{N(y)+N(y-1)\}/2 \tag{3}$$

Equations (1) to (3) mean calculation of the difference between a bias current signal VSD (detection signal) when the switching element T is ON, and a bias current signal VSD (detection signal) when the switching element T is OFF.

In this specification, the method of reducing external noise in the above-described way will be called CDS (Correlated Double Sampling). The CDS calculation is not limited to the above-described calculation method. For example, the calculation unit 130 may calculate X(y) by using sample values not adjacent to each other, such as S(y−1) and N(y−2). The calculation unit 130 may calculate radiation information after performing another arithmetical operation and differentiation/integration for a plurality of sample values of the bias current signal VSD. As S(y) and N(y) in the yth sampling, the sum of a plurality of sample values obtained by performing sampling a plurality of times (for example, eight times) in this period may be used.

Figure 6:
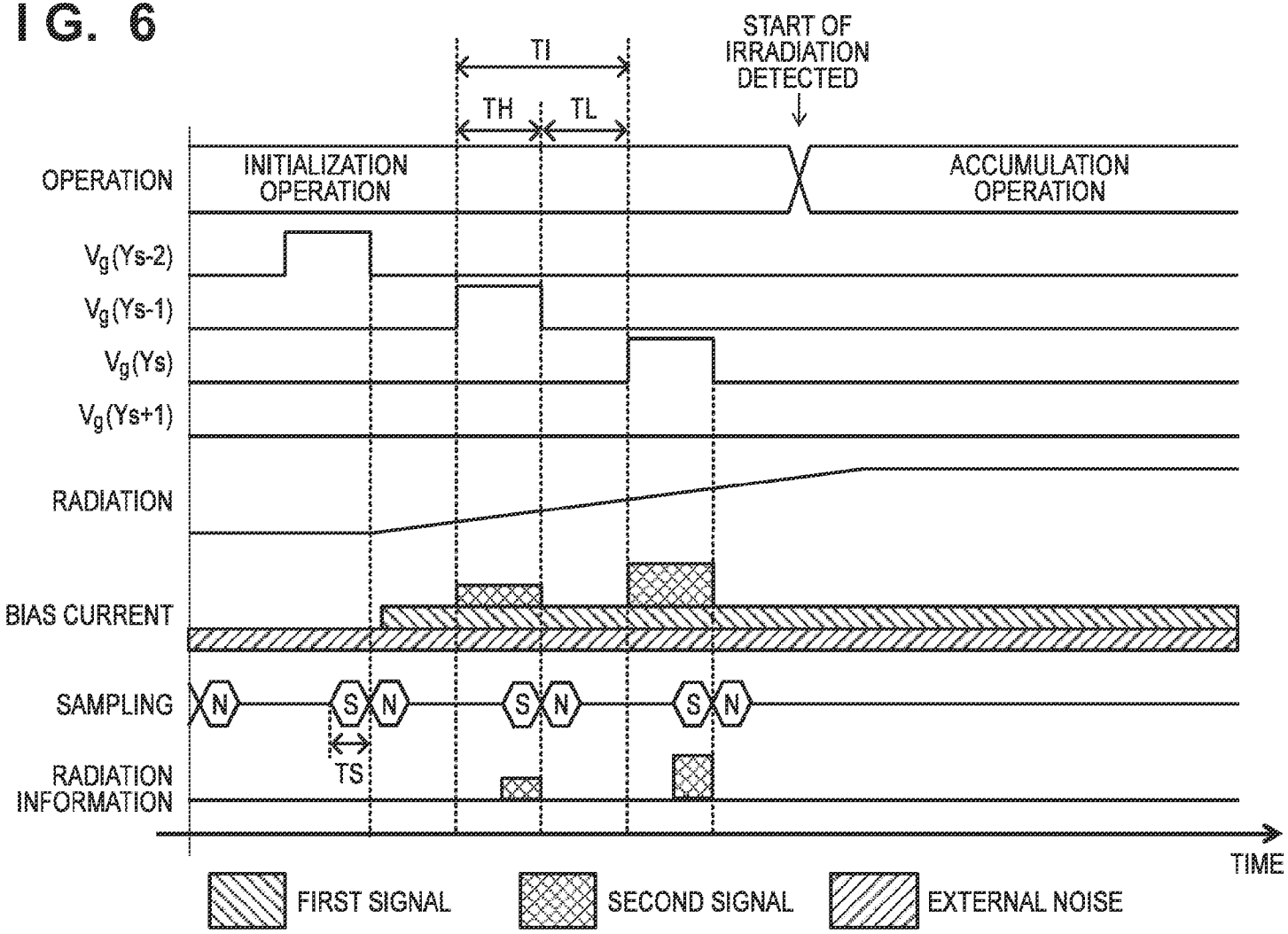
FIG. 6 is a timing chart for explaining an example of the detailed operation of the radiation imaging apparatus in FIG. 1.

Next, another example of the operation of the radiation imaging apparatus 100 when attention is paid to the timing to shift from the initialization operation to the accumulation operation will be explained with reference to FIG. 6. The example of FIG. 6 is different from the example of FIG. 5 in the sampling cycle TS of the A/D converter 340 of the detection circuit 120. The remaining points can be the same as those in the example of FIG. 5, and a repetitive description thereof will be omitted. In the example of FIG. 6, the sampling cycle TS of the A/D converter 340 is set to be shorter than ½ of the driving cycle TI of the driving circuit 102. The sample value of the bias current signal VSD sampled in the second half of the ON time TH is defined as the effective value S. The sample value of the bias current signal VSD sampled in the first half of the OFF time TL is defined as the noise value N. Similar to the example of FIG. 5, S(y) and N(y) are an effective value S and noise value N output in the yth initialization operation, respectively. X(y) is radiation information used by the determination unit 131 in step S320 (FIG. 3) to detect irradiation with radiation in the yth initialization operation. In this case, the calculation unit 130 can calculate X(y) as per:

$$X(y)=S(y)-N(y) \tag{4}$$

By shortening the sampling cycle TS, an external noise value contained in the effective value S and an external noise value contained in the noise value N can be brought close to each other. As a result, the influence of external noise in radiation information can be reduced.

Figure 7:
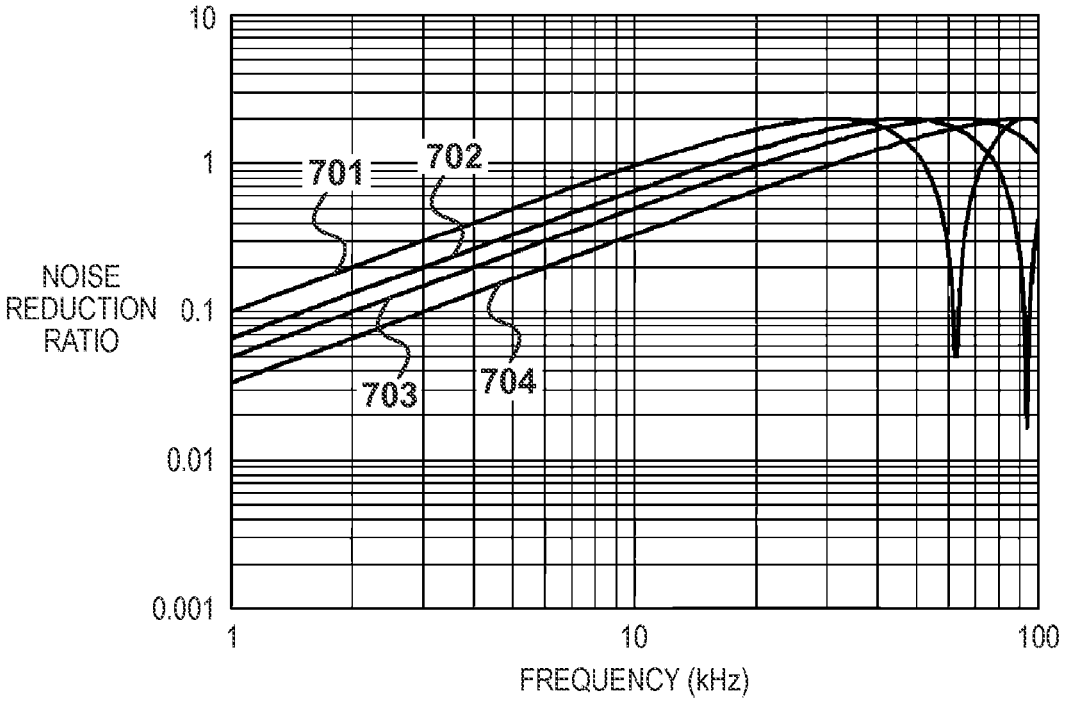
FIG. 7 is a graph for explaining the effects of the example of the detailed operation of the radiation imaging apparatus in FIG. 1.

FIG. 7 shows experimental results of calculating a noise reduction ratio when the sampling cycle TS is set to various values. In the graph of FIG. 7, the abscissa represents the frequency of external noise, and the ordinate represents the noise reduction ratio. Each of the ON time TH and OFF time TL of the driving signal is set to be 16 μsec. At this time, curves 701, 702, 703, and 704 indicate noise reduction ratios at respective frequencies when the sampling cycle TS is set to be 16 μsec, 10.6 μsec, 8 μsec, and 5.3 μsec, respectively. As is apparent from FIG. 7, in the low frequency region, noise is reduced more efficiently as the sampling cycle TS is shorter.

Figure 8:
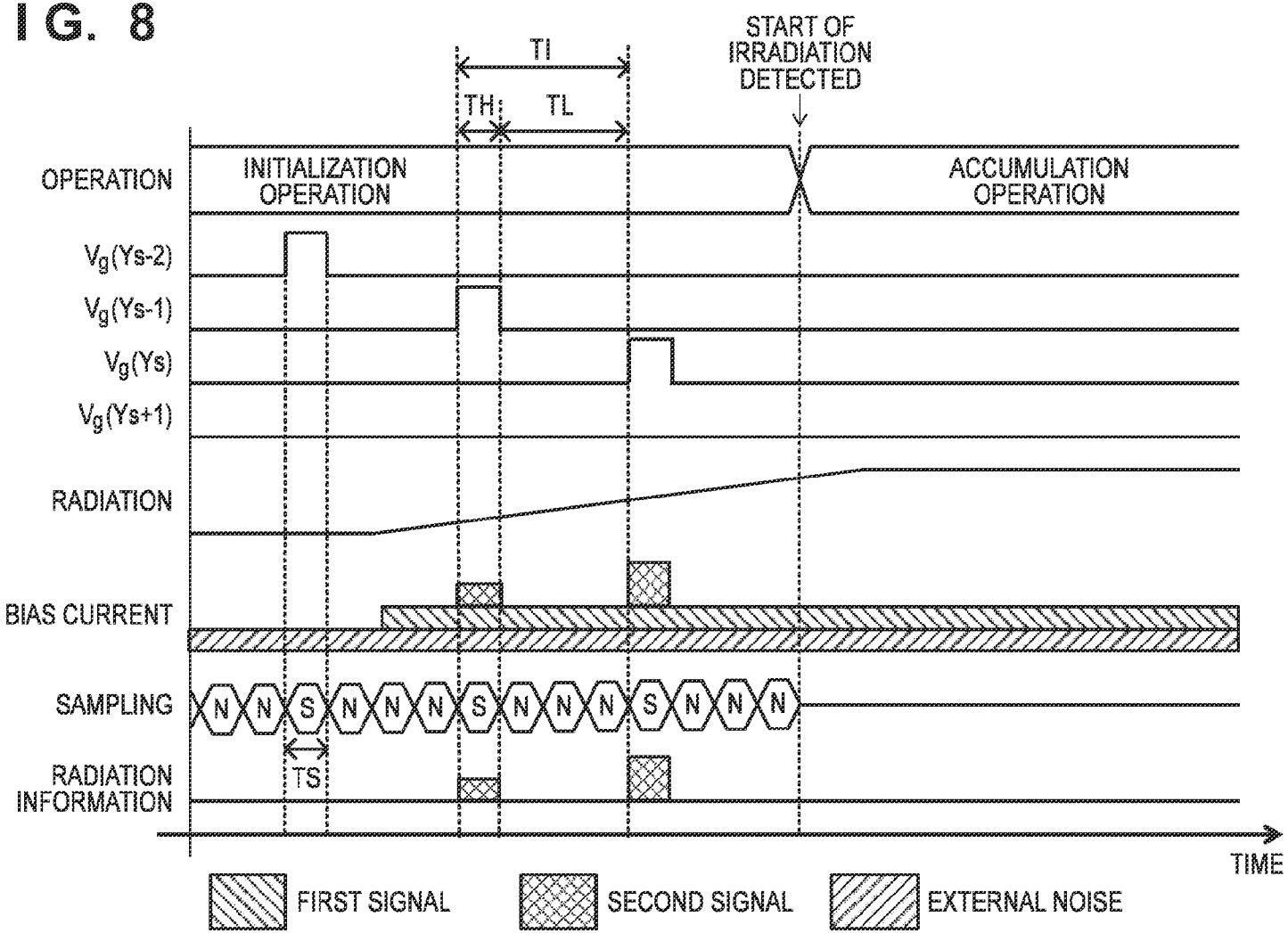
FIG. 8 is a timing chart for explaining another example of the detailed operation of the radiation imaging apparatus in FIG. 1.

Next, still another example of the operation of the radiation imaging apparatus 100 when attention is paid to the timing to shift from the initialization operation to the accumulation operation will be explained with reference to FIG. 8. The example of FIG. 8 is different from the example of FIG. 5 in the driving timing (ON time TH and OFF time TL) by the driving circuit 102, and the sampling cycle TS of the A/D converter 340 of the detection circuit 120. The remaining points can be the same as those in the example of FIG. 5, and a repetitive description thereof will be omitted. In the example of FIG. 8, the OFF time TL is longer than the ON time TH. For example, the driving circuit 102 operates so that the OFF time TL becomes triple of the ON time TH. The sampling cycle TS is set to be equal to the ON time TH. In this case, the detection circuit 120 outputs one effective value S and three noise values N in one reset operation. S(y), N1(y), N2(y), and N3(y) are an effective value S and three noise values N output in the yth (y is an arbitrary natural number) initialization operation, respectively. X(y) is radiation information used by the determination unit 131 in step S320 (FIG. 3) to detect irradiation with radiation in the yth initialization operation. Note that N1(y), N2(y), and N3(y) are aligned sequentially from a value sampled at earlier time.

Various methods of calculating X(y) by the calculation unit 130 using the effective value S and noise value N will be explained below. Similar to the example described with reference to FIG. 5, the calculation unit 130 may calculate X(y) according to one of equations (5) to (7):

$$X(y)=S(y)-N1(y) \tag{5}$$

$$X(y)=S(y)-N3(y-1) \tag{6}$$

$$X(y)=S(y)-\{N1(y)+N3(y-1)\}/2 \tag{7}$$

In equations (5) to (7), X(y) is calculated using an effective value S(y) obtained in the yth initialization operation, and noise values N1(y) and N3(y−1) sampled before and after the effective value S(y).

Instead, the calculation unit 130 may calculate X(y) according to:

$$X(y)=S(y)-\{3\times N1(y)-3\times N2(y)+N3(y)\} \tag{8}$$

In equation (8), the noise values N (N1(y) to N3(y) in the above example) are weighted. More specifically, the noise values N are multiplied by different coefficients. In equation (8), X(y) is obtained by repeating subtraction between adjacent values for one effective value S and a plurality of noise values N obtained in the same initialization operation. More specifically, first, the calculation unit 130 performs subtraction between adjacent sample values in the same initialization operation, sets the difference between the effective value S and the noise value N as a new effective value S, and sets the difference between the noise values N as a new noise value N. The calculation unit 130 repeats this calculation until one value is obtained. Hence, when n noise values N are obtained in one initialization operation, the calculation unit 130 repeats the above calculation by n stages. This processing is given by:

calculation at the first stage:

$$S'(y)=S(y)-N1(y)$$

$$N1'(y)=N1(y)-N2(y)$$

$$N2'(y)=N2(y)-N3(y)$$

calculation at the second stage:

$$S''(y)=S'(y)-N1'(y)$$

$$N1''(y)=N1'(y)-N2'(y)$$

calculation at the third stage:

$$X(y)=S''(y)-N1''(y)$$

Here, ' means updated effective and noise values.

In equation (8), the calculation unit 130 calculates radiation information by using one effective value S and three noise values N obtained successively after the effective value S. Instead, the calculation unit 130 may calculate radiation information by using one effective value S and three noise values N obtained successively before the effective value S as per:

$$X(y)=S(y)-\{3\times N3(y-1)-3\times N2(y-1)+N1(y-1)\} \tag{9}$$

Even in equation (9), X(y) is obtained by the same calculation as that of equation (7).

In some other embodiments, the calculation unit 130 may calculate radiation information by averaging radiation information obtained by equation (8) and radiation information obtained by equation (9), as represented by:

$$X(y)=S(y)-\{3\times N1(y)-3\times N2(y)+N3(y)+3\times N3(y-1)-3\times N2(y-1)+N1(y-1)\}/2 \quad (10)$$

In equation (10), the calculation unit 130 calculates radiation information based on one effective value S and the weighted values of six noise values N obtained successively before and after the effective value S.

In all equations (8) to (10), a noise value N sampled nearer the timing of switching between the effective value S and the noise value N is multiplied by a larger weight. A large weight means that the influence on radiation information is large, and can mean that, for example, the absolute value of the coefficient of the noise value N is large. This also applies to the following example.

Figure 9:
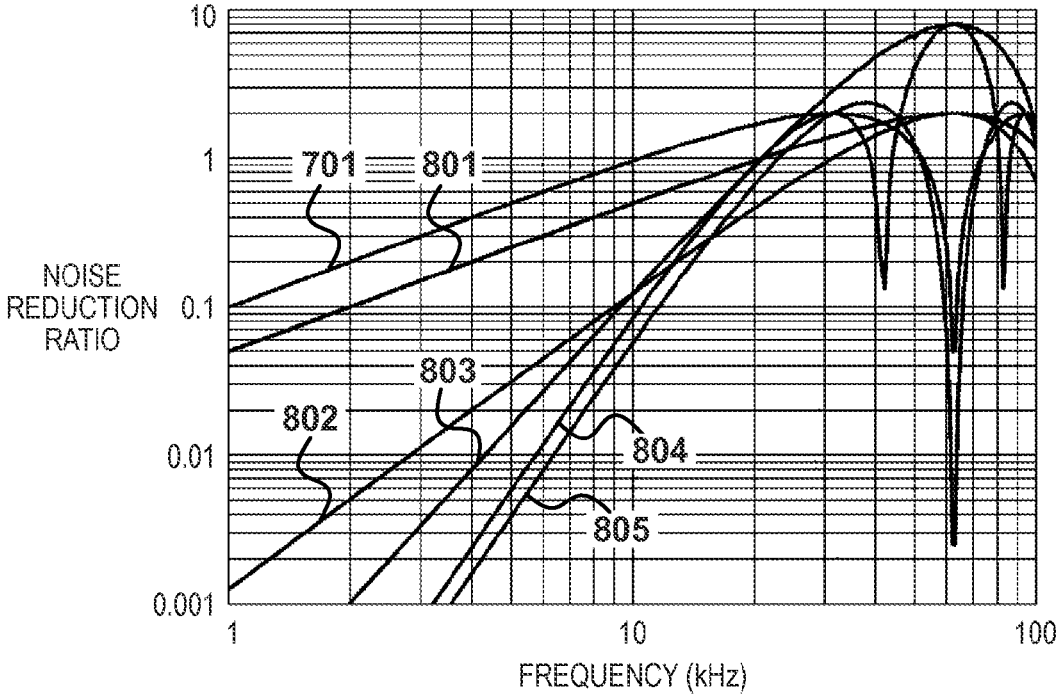
FIG. 9 is a graph for explaining the effects of the other example of the detailed operation of the radiation imaging apparatus in FIG. 1.

FIG. 9 shows the experimental results of calculating a noise reduction ratio when the radiation information X(y) is calculated by various methods. In the graph of FIG. 9, the abscissa represents the frequency of external noise, and the ordinate represents the noise reduction ratio. The ON time TH of the driving signal is set to be 8 μsec, and the OFF time TL is set to be 24 μsec. At this time, curves 801, 802, 803, and 804 indicate noise reduction ratios at respective frequencies when the radiation information X(y) is calculated by equations (5), (7), (8), and (10) above, respectively. For comparison, FIG. 9 also shows the curve 701 in FIG. 7. As is apparent from FIG. 9, in the low frequency region, noise is reduced efficiently by weighting a plurality of noise values N to calculate radiation information.

Radiation information in each of equations (8) to (10) may be calculated by sequentially performing subtraction between adjacent sample values, or by adding or subtracting a value obtained by multiplying a sample value by a coefficient according to each of these equations. This also applies to a case in which radiation information is calculated according to an equation to be described later. External noise which flows when a pressure or shock is applied to the radiation imaging apparatus 100 can take a value which is 10 to 100 times larger than a current flowing through the bias line Vs upon irradiation with radiation. Thus, the dynamic range of the detection circuit 120 can be set so that sampling can be performed without saturating external noise. When the dynamic range of the detection circuit 120 is widened, the control unit 106 may be configured to multiply radiation information and a threshold by integers so that radiation information is calculated by only addition, subtraction, and multiplication, in order to reduce generation of a quantization error caused by division.

Figure 10:
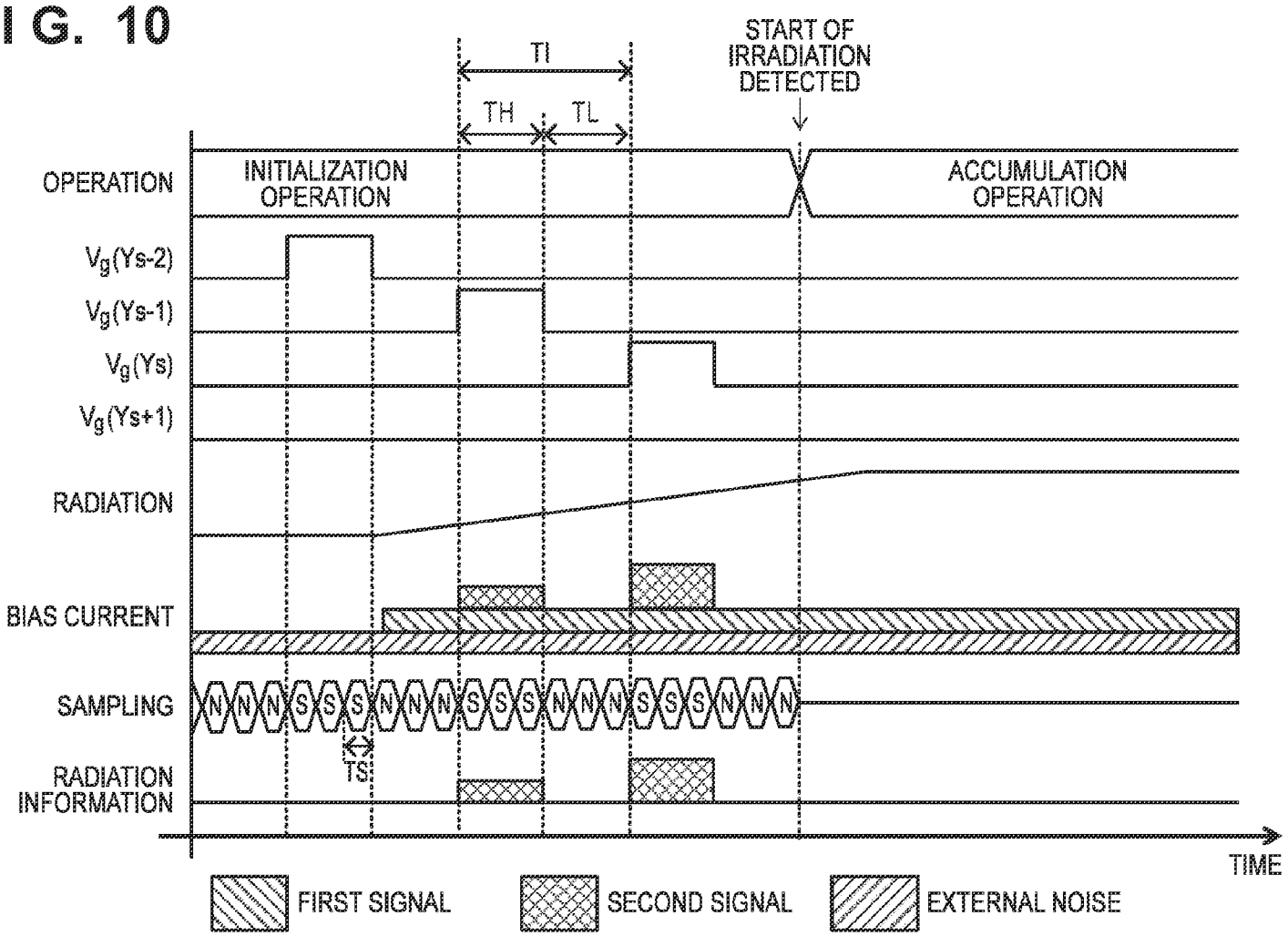
FIG. 10 is a timing chart for explaining still another example of the detailed operation of the radiation imaging apparatus in FIG. 1.

Next, still another example of the operation of the radiation imaging apparatus 100 when attention is paid to the timing to shift from the initialization operation to the accumulation operation will be explained with reference to FIG. 10. The example of FIG. 10 is different from the example of FIG. 5 in the sampling cycle TS of the A/D converter 340 of the detection circuit 120. The remaining points can be the same as those in the example of FIG. 5, and a repetitive description thereof will be omitted. In the example of FIG. 10, the OFF time TL and ON time TH are equal to each other. The sampling cycle TS is set to be shorter than the ON time TH. For example, the sampling cycle TS is set to be ⅓ of the ON time TH. In this case, the detection circuit 120 outputs three effective values S and three noise values N in one reset operation. S1(y), S2(y), S3(y), N1(y), N2(y), and N3(y) are three effective values S and three noise values N output in the yth (y is an arbitrary natural number) initialization operation, respectively. X(y) is radiation information used by the control unit 106 in step S320 (FIG. 3) to detect irradiation with radiation in the yth initialization operation. Note that S1(y), S2(y), S3(y), N1(y), N2(y), and N3(y) are aligned sequentially from a value sampled at earlier time.

Various methods of calculating X(y) by the calculation unit 130 using the effective value S and noise value N will be explained below. For example, the calculation unit 130 may calculate X(y) according to one of equations (11) to (13):

$$X(y)=S1(y)+S2(y)+S3(y)-\{N1(y)+N2(y)+N3(y)\} \quad (11)$$

$$X(y)=S1(y)+S2(y)+S3(y)-\{N1(y-1)+N2(y-1)+N3(y-1)\} \quad (12)$$

$$X(y)=2\times S1(y)+2\times S2(y)+2\times S3(y)-\{N1(y)+N2(y)+N3(y)+N1(y-1)+N2(y-1)+N3(y-1)\} \quad (13)$$

According to equations (11) to (13), the calculation unit 130 calculates X(y) by using three effective values S(y) obtained in the yth initialization operation, and three or six noise values N sampled before and after these effective values S(y). For the above-described reason, the calculation unit 130 calculates radiation information by only addition and subtraction of the effective values and noise values, and does not use division.

Instead, the calculation unit 130 may calculate X(y) according to:

$$X(y)=\{11\times S1(y)+5\times S2(y)+2\times S3(y)\}/18-\{11\times N3(y-1)+5\times N2(y-1)+2\times N1(y-1)\}/18 \quad (14)$$

In equation (14), the effective values S and noise values N (S1(y) to S3(y) and N1(y−1) to N3(y−1) in the above example) are weighted. More specifically, the effective values S and noise values N are multiplied by different coefficients. In equation (14), X(y) is obtained by averaging, up to k=1 to 3, the differences each between the average of k adjacent effective values and that of k adjacent noise values, out of three effective values S obtained in the yth initialization operation and three noise values N obtained in the immediately preceding (y−1)th initialization operation. Letting D1 to D3 be the differences each between the average of the effective values S and the average of the noise values N, this processing is given by:

difference between one effective value S and one noise value N:

$$D1=S1(y)-N3(y-1)$$

difference between the average of two effective values S and the average of two noise values N:

$$D2=\{S1(y)+S2(y)\}/2-\{N3(y-1)+N2(y-1)\}/2$$

difference between the average of three effective values S and the average of three noise values N:

$$D3=\{S1(y)+S2(y)+S3(y)\}/3-\{N3(y-1)+N2(y-1)+N1(y-1)\}/3$$

average of the differences:

$$X(y)=(D1+D2+D3)/3$$

In equation (14), the calculation unit 130 calculates radiation information by using three effective values S and three noise values N obtained successively before the effective values S. Instead, the calculation unit 130 may calculate radiation information by using three effective values S and three noise values N obtained successively after the effective values S:

$$X(y)=\{11\times S3(y)+5\times S2(y)+2\times S1(y)\}/18-\{11\times N1(y)+5\times N2(y)+2\times N3(y)\}/18 \quad (15)$$

Even in equation (15), X(y) is obtained by the same calculation as that of equation (14). In some other embodiments, the calculation unit 130 may calculate radiation information by averaging radiation information obtained by equation (14) and radiation information obtained by equation (15). In this case, the calculation unit 130 calculates radiation information for the yth initialization operation based on values obtained by weighting three effective values S obtained in the yth initialization operation, and six noise values N obtained before and after these effective values S. In both equations (14) and (15), a noise value N sampled nearer the timing of switching between the effective value S and the noise value N is multiplied by a larger weight.

Figure 11:
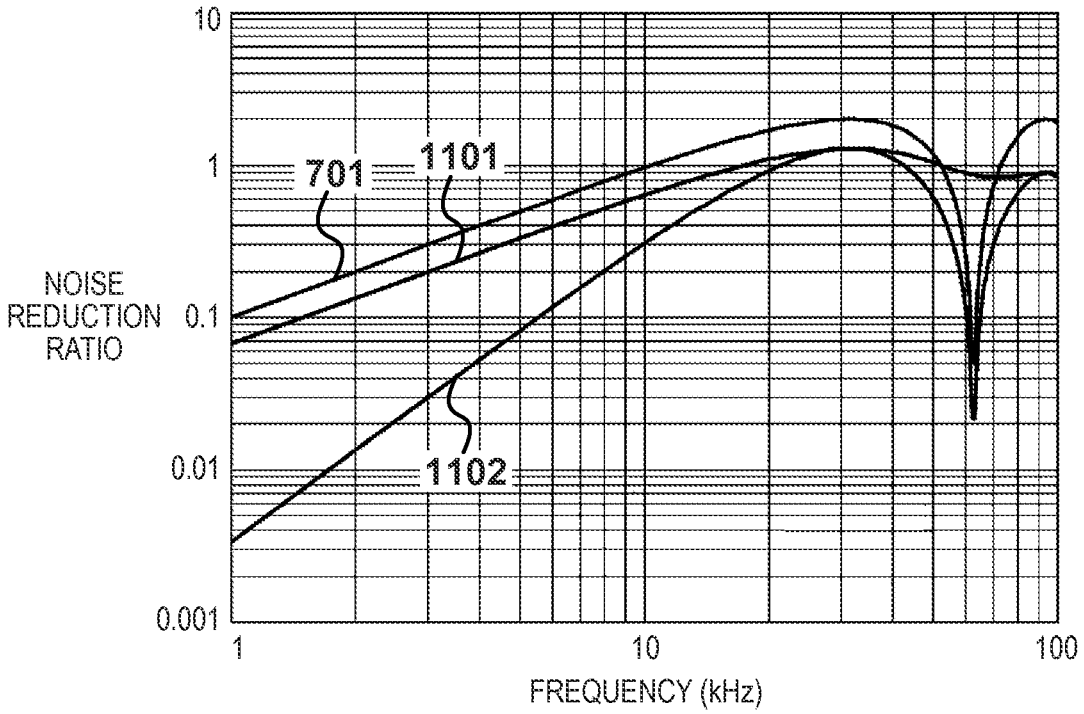
FIG. 11 is a graph for explaining the effects of the still other example of the detailed operation of the radiation imaging apparatus in FIG. 1.

FIG. 11 shows the experimental results of calculating a noise reduction ratio when the radiation information X(y) is calculated by various methods. In the graph of FIG. 11, the abscissa represents the frequency of external noise, and the ordinate represents the noise reduction ratio. The ON time TH of the driving signal is set to be 16 μsec, and the OFF time TL is set to be 16 μsec. The sampling time TS is set to be 5.3 μsec. At this time, curves 1101 and 1102 indicate noise reduction ratios at respective frequencies when the radiation information X(y) is calculated based on equation (14) and the average of equations (14) and (15), respectively. For comparison, FIG. 11 also shows the curve 701 in FIG. 7. As is apparent from FIG. 11, in the low frequency region, noise is reduced efficiently by weighting a plurality of noise values N and calculating radiation information.

Figure 12:
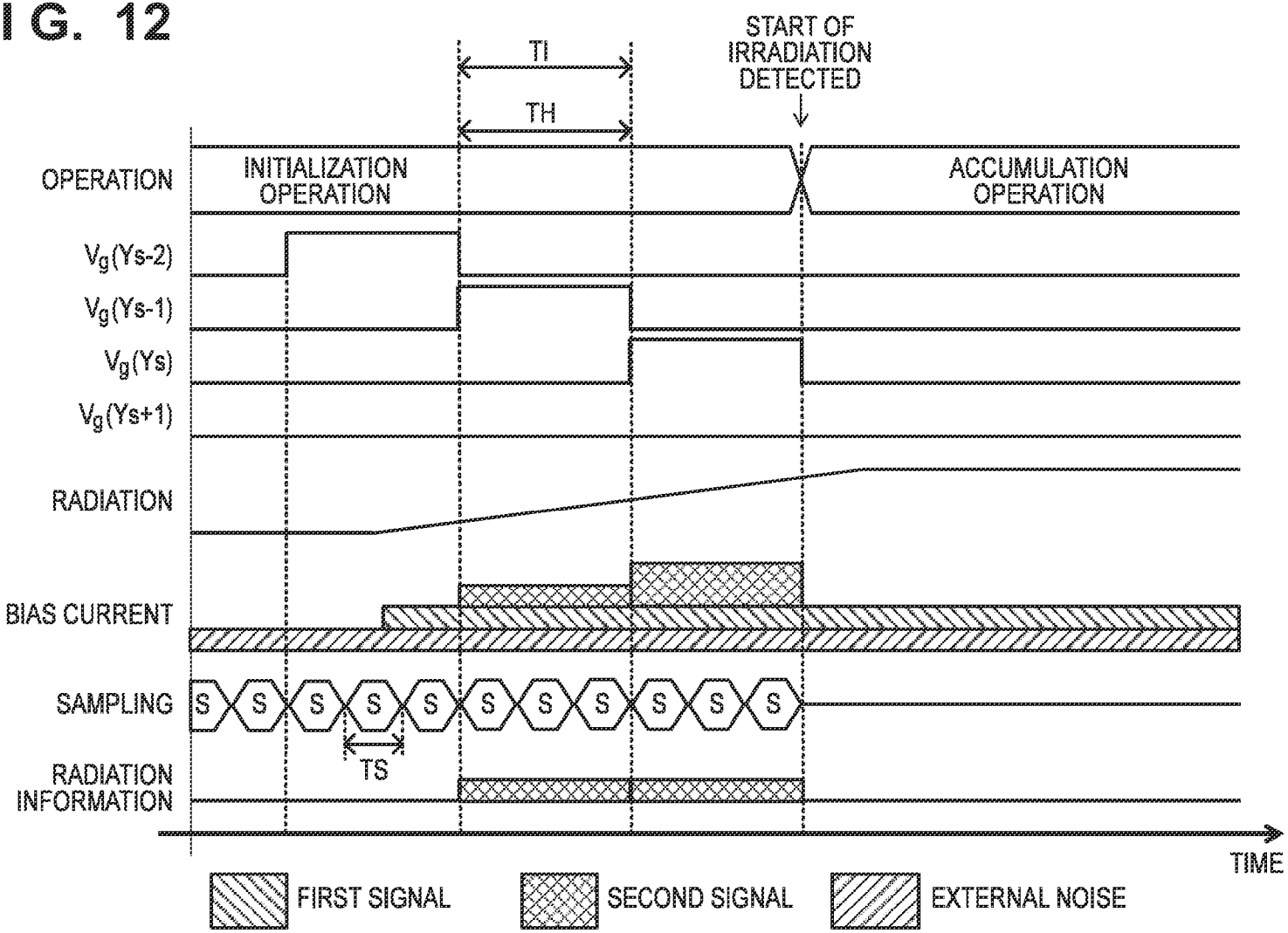
FIG. 12 is a timing chart for explaining still another example of the detailed operation of the radiation imaging apparatus in FIG. 1.

Next, still another example of the operation of the radiation imaging apparatus 100 when attention is paid to the timing to shift from the initialization operation to the accumulation operation will be explained with reference to FIG. 12. The example of FIG. 12 is different from the example of FIG. 5 in the sampling cycle TS of the A/D converter 340 of the detection circuit 120, and the OFF time TL. The remaining points can be the same as those in the example of FIG. 5, and a repetitive description thereof will be omitted. In the example of FIG. 12, the driving cycle TI of the driving circuit 102 is equal to the ON time TH, and the OFF time TL is 0. That is, in one initialization operation, the driving circuit 102 maintains a driving signal to the driving line G at the active level. As a result, simultaneously when a driving signal to a certain row is switched from high level to low level, a driving signal to the next row is switched from low level to high level. In addition, the sampling cycle TS is set to be shorter than the ON time TH. For example, the sampling cycle TS is set to be ⅓ of the ON time TH. In this case, the detection circuit 120 outputs three effective values S in one reset operation.

It is generally known that when the ON/OFF state of the switching element T is switched, a current flows through the bias line Vs. This current can be called switching noise. Switching noises can be canceled by each other by superposing the trailing of a driving signal to the switching elements T on a certain pixel row and the rising of a driving signal to the switching elements T on another pixel row, as shown in FIG. 12. Hence, the example of FIG. 12 is effective when switching noise is large.

S1(y), S2(y), and S3(y) are three effective values S output in the yth (y is an arbitrary natural number) initialization operation, respectively. X(y) is radiation information used by the determination unit 131 in step S320 (FIG. 3) to detect irradiation with radiation in the yth initialization operation. Note that S1(y), S2(y), and S3(y) are aligned sequentially from a value sampled at earlier time.

In this case, the calculation unit 130 may calculate X(y) according to:

$$X(y)-\{11\times S1(y)+5\times S2(y)+2\times S3(y)\}/18-\{11\times S3(y-1)+5\times S2(y-1)+2\times S1(y-1)\}/1 \quad (16)$$

In equation (16), similar to equation (14), X(y) is obtained by averaging, up to k=1 to 3, the differences each between the average of k adjacent effective values and that of k adjacent effective values, out of three effective values S obtained in the yth initialization operation and three effective values S obtained in the (y−1)th initialization operation. Letting D1 to D3 be the differences each between the average of the effective values S obtained in the yth initialization and the average of the effective values S obtained in the (y−1)th initialization, this processing is given by:

difference between one effective value S in the yth initialization and one effective value S in the (y−1)th initialization:

$$D1=S1(y)-S3(y-1)$$

difference between the average of two effective values S in the yth initialization and the average of two effective values S in the (y−1)th initialization:

$$D2=\{S1(y)+S2(y)\}/2-\{S3(y-1)+S2(y-1)\}/2$$

difference between the average of three effective values S in the yth initialization and the average of three effective values S in the (y−1)th initialization:

$$D3=\{S1(y)+S2(y)+S3(y)\}/3-\{S3(y-1)+S2(y-1)+S1(y-1)\}/3$$

average of the differences:

$$X(y)=(D1+D2+D3)/3$$

Equation (16) can have the same noise reduction characteristic as that of equation (14) because the same calculation as equation (14) is performed for external noise. The radiation information X(y) obtained by equation (16) is a value obtained by weighting a plurality of effective values S obtained in successive initialization operations and calculating a difference. If this value exceeds a threshold, the determination unit 131 detects irradiation with radiation.

Figure 13:
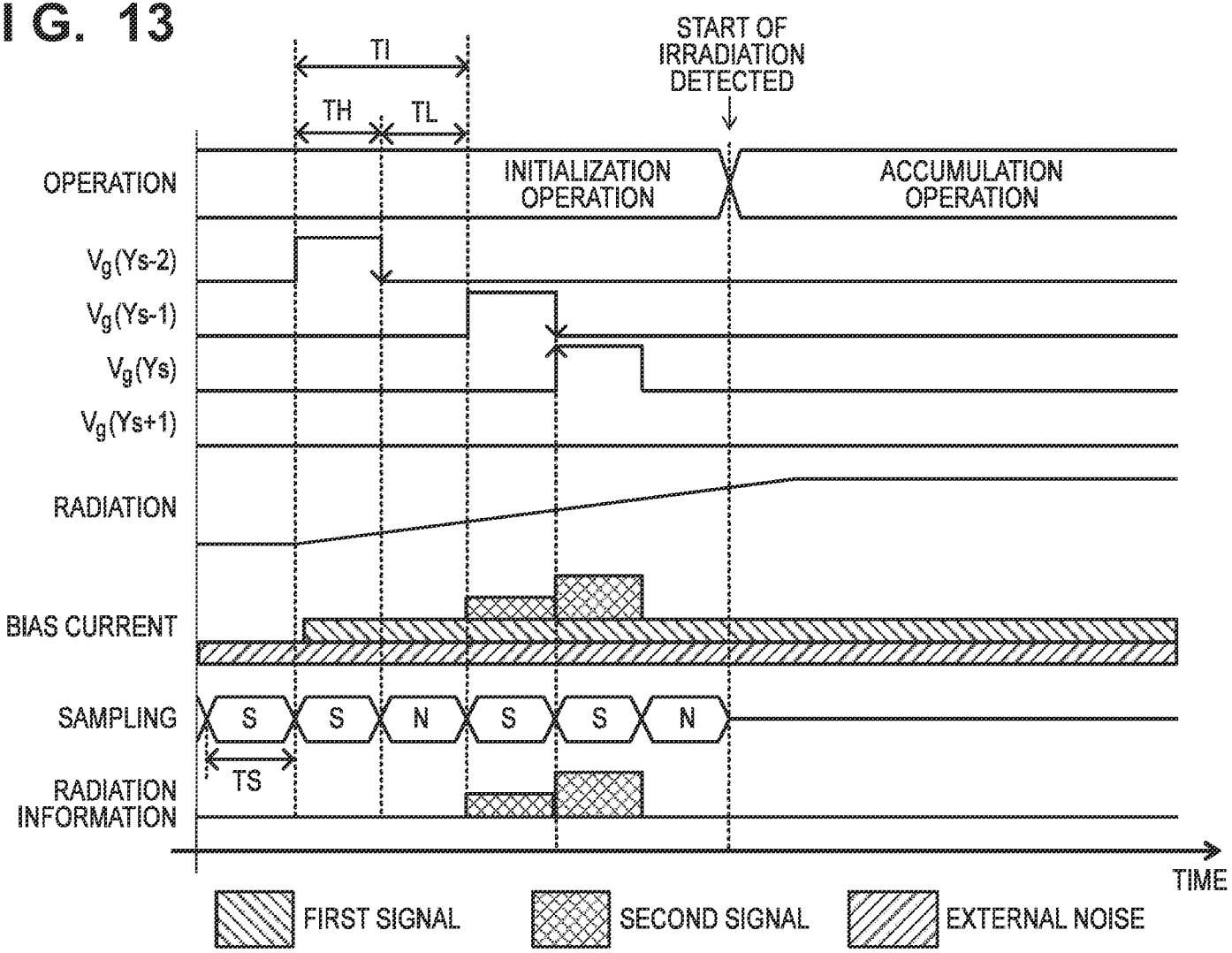
FIG. 13 is a timing chart for explaining still another example of the detailed operation of the radiation imaging apparatus in FIG. 1.

Next, still another example of the operation of the radiation imaging apparatus 100 when attention is paid to the timing to shift from the initialization operation to the accumulation operation will be explained with reference to FIG. 13. The example of FIG. 13 is different from the example of FIG. 5 in the driving timing (ON time TH and OFF time TL) by the driving circuit 102. The remaining points can be the same as those in the example of FIG. 5, and a repetitive description thereof will be omitted. In the example of FIG. 13, the driving circuit 102 superposes the trailing and rising of two successively supplied driving signals. For example, the driving circuit 102 superposes the trailing of a driving signal in an odd-numbered initialization operation and the rising of a driving signal in an even-numbered initialization operation. In other words, the driving circuit 102 sets the OFF time TL in an odd-numbered initialization operation to be 0. As a result, the driving cycle TI differs between odd- and even-numbered initialization operations. In the example of FIG. 13, the trailing of a driving signal supplied to the driving line G on the (Ys−1)th row and the rising of a driving signal supplied to the driving line G on the Ysth row overlap each other.

When the sampling cycle TS of the A/D converter 340, the ON time TH, and the OFF time TL are set to be equal to each other, the detection circuit 120 outputs one effective value S in an odd-numbered reset operation, and outputs one effective value S and one noise value N in an even-numbered reset operation. S(y) is an effective value S output in the yth (y is an arbitrary odd number) initialization operation. S(y+1) and N(y+1) are an effective value S and noise value N output in the immediately succeeding (y+1)th initialization operation, respectively. X(y) is radiation information used by the determination unit 131 in step S320 (FIG. 3) to detect irradiation with radiation in the yth initialization operation.

In this case, the calculation unit 130 may calculate X(y) according to:

$$X(y)=[S(y)+S(y+1)-\{N(y+1)-N(y-1)\}/18] \quad (17)$$

Equation (17) can increase the radiation signal amount per unit time.

Next, another example of the sampling timing of the detection circuit 120 will be explained with reference to FIG. 14. A current (second signal) flowing through the bias line Vs in proportion to the amount of charges accumulated in the conversion element 201 of the pixel PIX until the switching element T of a pixel PIX irradiated with radiation is turned on has the following property. That is, this current is a spike-like current which starts flowing at the same time (at time t0) as the rising of the driving signal, peaks when the switching element T is turned on (at time t1), and then stops flowing (at time t2). The time until the switching element T is turned on after the rising of the driving signal is determined by the time constant which, in turn, is defined by the resistance and the parasitic capacitance of the driving line G.

Figure 14:
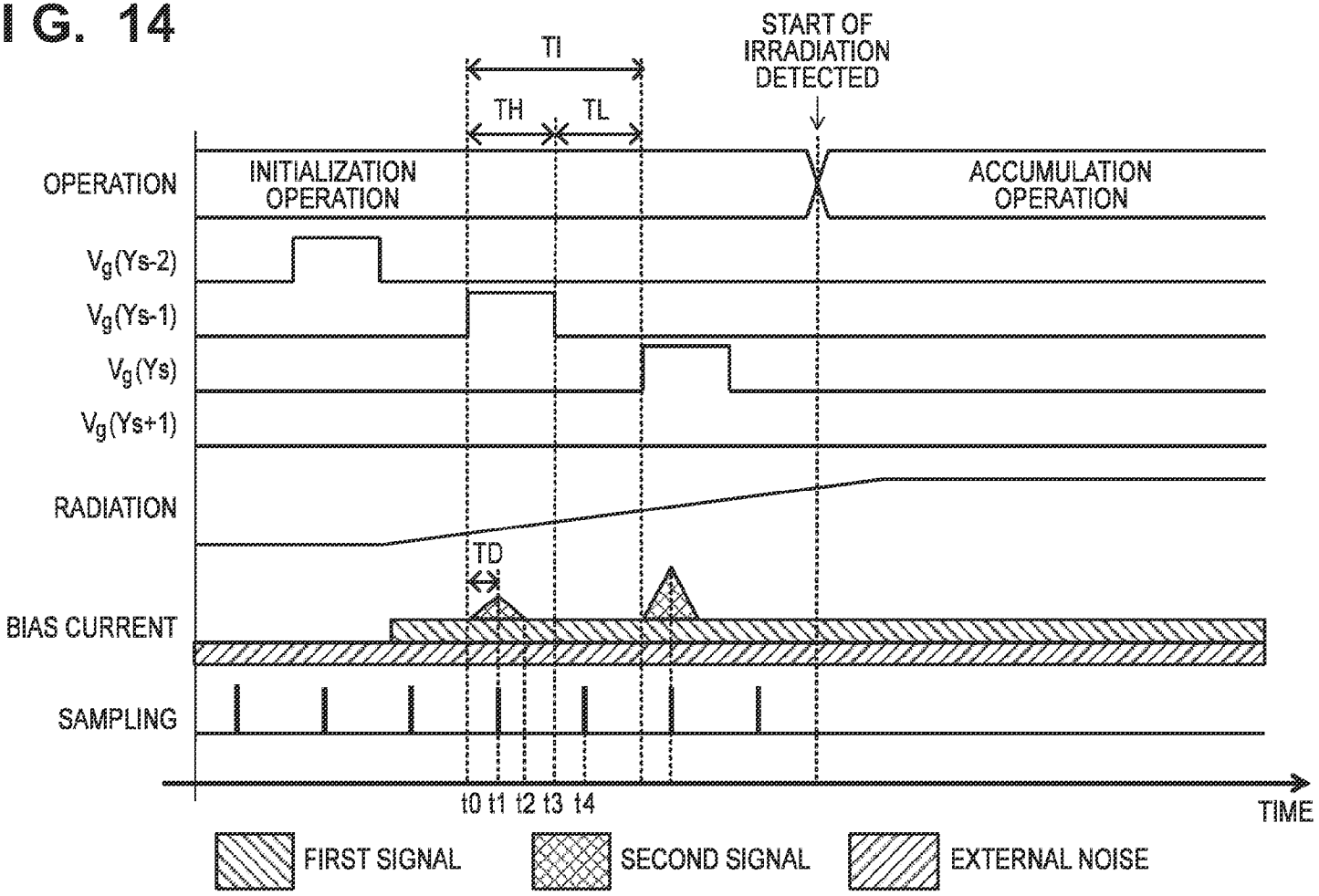
FIG. 14 is a timing chart for explaining still another example of the detailed operation of the radiation imaging apparatus in FIG. 1.

In the example shown in FIG. 14, the detection circuit 120 samples a current flowing through the bias line Vs upon the lapse of a delay time TD (at time t1) after the driving circuit 102 activates the driving signal in one initialization operation (at time t0). A sample value output from the detection circuit 120 in this case serves as the effective value S. Further, the detection circuit 120 samples a current flowing through the bias line Vs upon the lapse of the same delay time TD (at time t4) after the driving circuit 102 inactivates the driving signal in one initialization operation (at time t3). A sample value output from the detection circuit 120 in this case serves as the noise value N. The method of calculating radiation information from the effective value S and noise value N can be any one of the aforementioned methods. It is known that switching noise of the switching element T starts flowing at the same time as the rising or trailing of the driving signal and does not flow after the switching element T is switched to the ON state or OFF state. For this reason, the influence of switching noise on a radiation signal can be reduced by performing sampling by the detection circuit 120 at the above-mentioned timings.

The delay time TD is set to perform sampling at the timing (for example, time t1) of the peak of a current flowing through the bias line Vs. For example, the delay time TD is determined based on the time constant of the driving line G and the time constant of the bias line Vs. Alternatively, the delay time TD may be determined further based on the processing time of a circuit at the preceding stage of the A/D converter 340 in the detection circuit 120.

Figure 15:
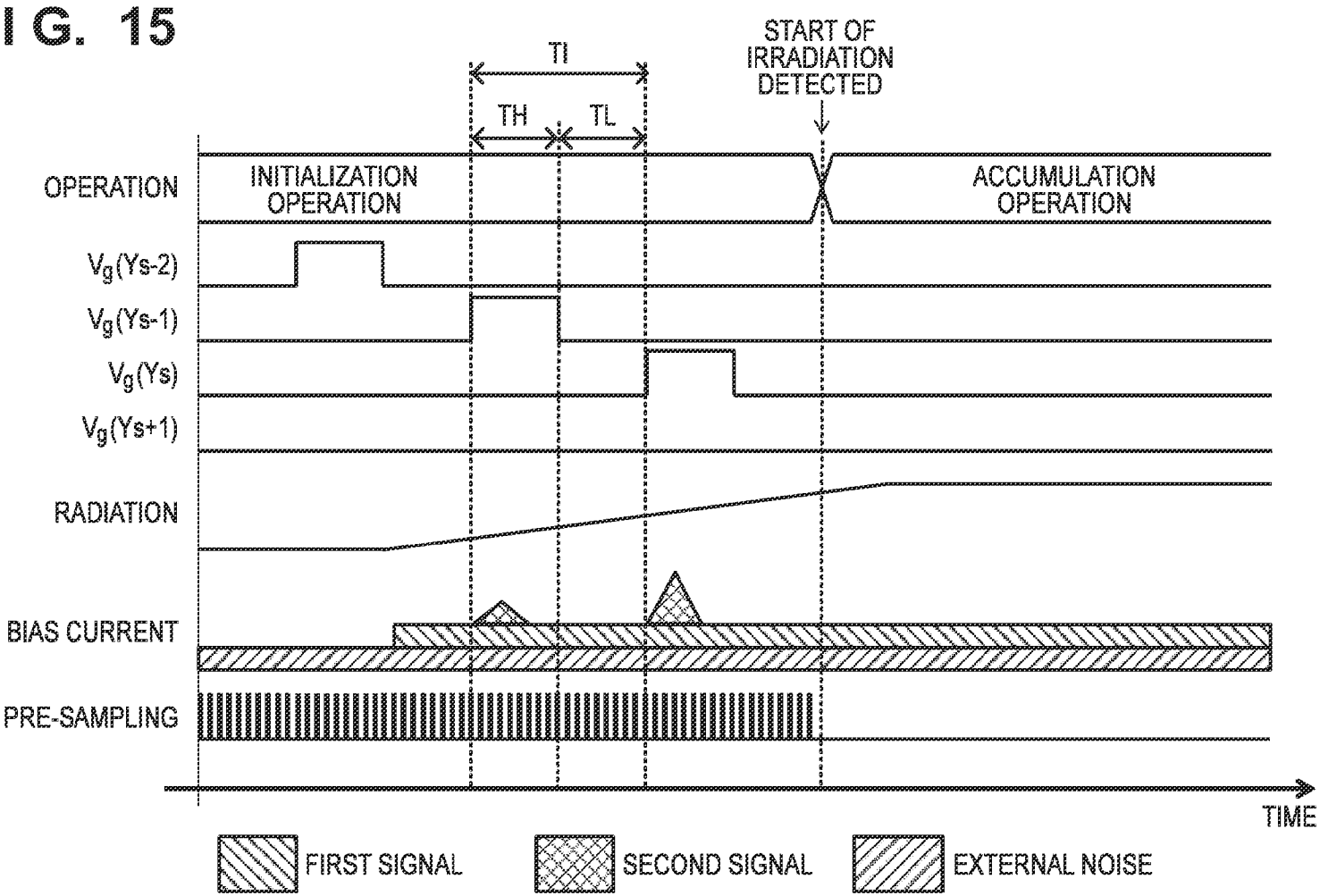
FIG. 15 is a timing chart for explaining still another example of the detailed operation of the radiation imaging apparatus in FIG. 1.

An example of a method of determining the delay time TD will be explained with reference to FIG. 15. The control unit 106 pre-samples a current flowing through the bias line Vs at a time interval shorter than the sampling interval in FIG. 14. The manufacturer of the radiation imaging apparatus 100 irradiates the radiation imaging apparatus 100 with test radiation during pre-sampling. The control unit 106 stores, as the delay time TD, the time between the rising time of the driving signal in one initialization operation and the sampling time when the sample value of the bias current signal VSD becomes maximum in this initialization operation.

Instead of using test radiation, a current flowing through the bias line Vs by dark charges accumulated in the pixel PIX may be used. During a predetermined period, the control unit 106 maintains at low level a driving signal supplied from the driving circuit 102, and waits for accumulation of dark charges in the pixel PIX. After that, the control unit 106 starts the initialization operation shown in FIG. 15. When the switching element T is turned on, a current corresponding to the dark charges flows through the bias line Vs. Based on this current, the control unit 106 determines the delay time TD.

The time constant of the driving line G, the time constant of the bias line Vs, and the processing time of the detection circuit 120 may change depending on aging deterioration after product shipment and the temperature of the use environment. Considering this, the delay time TD may be determined even after product shipment. For example, the radiation imaging apparatus 100 may be configured to be able to switch between an adjustment mode in which pre-sampling mentioned above is executed, and a normal mode in which normal sampling is executed. In the adjustment mode, the user of the radiation imaging apparatus 100 irradiates the radiation imaging apparatus 100 with test radiation. Instead, the radiation imaging apparatus 100 may shift to the operation mode in which dark charges are accumulated. The control unit 106 stores, as the delay time TD, the time between the rising time of the driving signal in one initialization operation and the sampling time when the sample value of the bias current signal VSD becomes maximum in this initialization operation. When the radiation imaging apparatus 100 is changed to the normal mode, the detection circuit 120 performs sampling in accordance with the stored delay time TD.

As described above, by performing sampling at the timing of the peak of a current flowing through the bias line Vs, the S/N ratio can be increased to increase the detection accuracy of irradiation with radiation. In FIG. 15, sampling has been described based on the driving timing of the driving circuit 102 shown in FIG. 5. However, sampling may be performed upon the lapse of the delay time similarly at the driving timing in FIG. 12 or 13.

Figure 16:
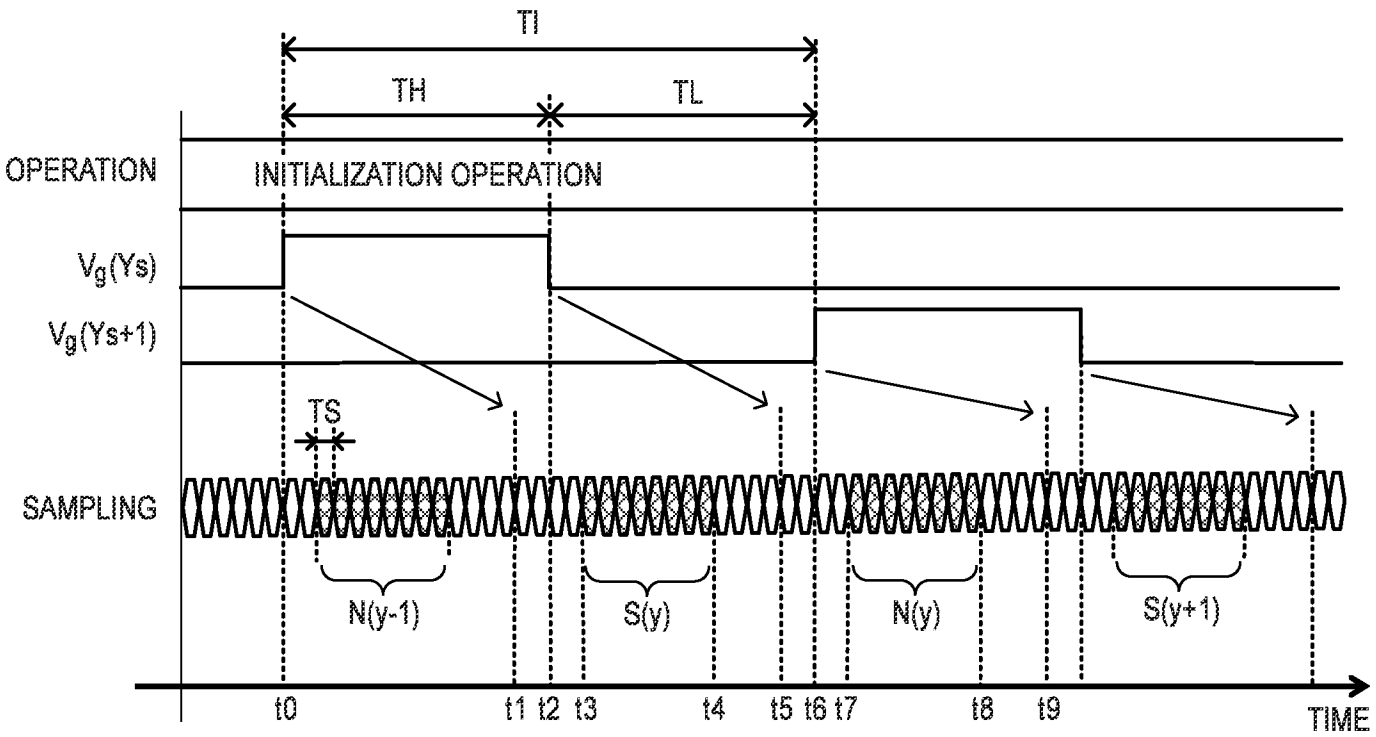
FIG. 16 is a timing chart for explaining still another example of the detailed operation of the radiation imaging apparatus in FIG. 1.

Next, another example of the operation of the radiation imaging apparatus 100 will be explained with reference to FIG. 16. The example of FIG. 16 is different from the example of FIG. 5 in the sampling cycle TS of the A/D converter 340 of the detection circuit 120. The remaining points can be the same as those in the example of FIG. 5, and a repetitive description thereof will be omitted. In the example of FIG. 16, the ON time TH=the OFF time TL=16 μsec, and the sampling cycle TS=1 μsec. In this case, the detection circuit 120 outputs 32 bias current signals VSD in one initialization operation.

In the yth initialization operation, assume that a driving signal supplied to the driving line G on the Ysth row is switched to high level at time to. Then, assume that the influence of switching of the driving signal to high level on an analog signal input to the A/D converter 340 of the detection circuit 120 appears at time t1. In this case, 16 sample values output from the detection circuit 120 at an interval between time t1 and time t5 correspond to a case in which the switching element T is ON in the yth initialization operation. The calculation unit 130 uses, as an effective value S(y) for the yth initialization operation, the sum of eight intermediate sample values output at an interval between time t3 and time t4, out of these 16 sample values. Similarly, 16 sample values output from the detection circuit 120 at an interval between time t5 and time t9 correspond to a case in which the switching element T is OFF in the yth initialization operation. The calculation unit 130 uses, as a noise value N(y) for the yth initialization operation, the sum of eight intermediate sample values output at an interval between time t7 and time t8, out of these 16 sample values. Then, the calculation unit 130 calculates radiation information according to equations (1) to (3) described above.

Figure 17:
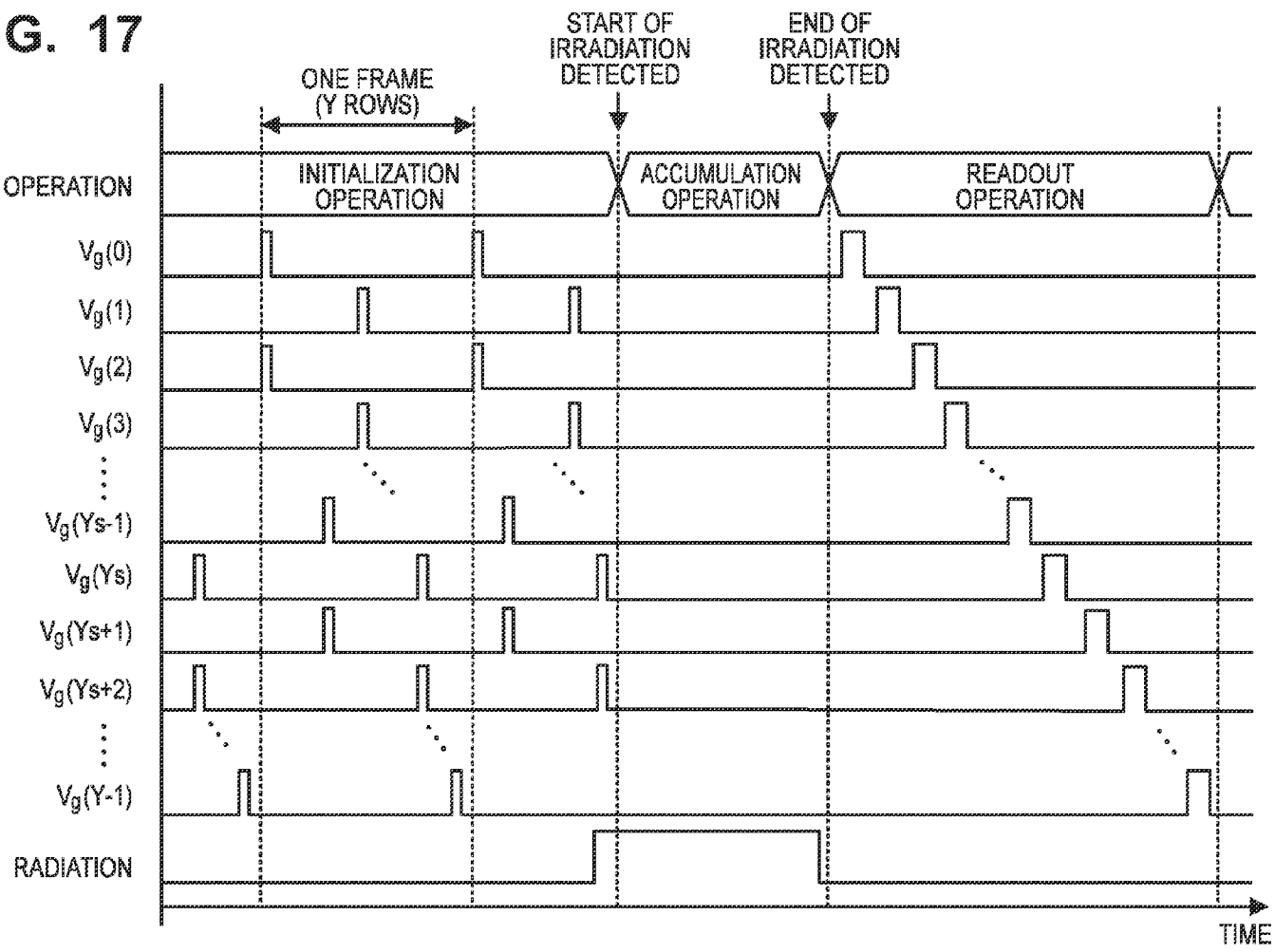
FIG. 17 is a timing chart for explaining another example of the operation of the radiation imaging apparatus in FIG. 1.

Next, another example of the operation of the radiation imaging apparatus 100 will be explained with reference to FIG. 17. The example of FIG. 17 is different from the example of FIG. 4 in the timing of the driving signal supplied from the driving circuit 102 to the driving line G in the initialization operation. The remaining points can be the same as those in the example of FIG. 4, and a repetitive description thereof will be omitted. In the initialization operation of one frame, the driving circuit 102 supplies high-level driving signals sequentially to odd-numbered driving lines G counted from one side of the pixel array 101, and then supplies high-level driving signals sequentially to even-numbered driving lines G. Although the pixels PIX accumulate radiation information until the operation shifts to the accumulation operation upon detecting irradiation with radiation after irradiation of radiation actually starts, the radiation imaging apparatus 100 performs the initialization operation for the pixels PIX. Thus, the radiation information is partially lost from the pixel row initialized during this period. However, pixel rows from which the radiation information is partially lost can be distributed in image data by preventing temporally successive resetting of adjacent pixel rows, as in the example of FIG. 17. This makes it easy to correct the image data by complementing the lost radiation information using information of pixel rows from which radiation information has been normally acquired.

In the example of FIG. 17, the driving circuit 102 supplies high-level driving signals simultaneously to the two driving lines G. In one initialization operation, a current proportional to charges accumulated in pixels of two rows flows through the bias line Vs. As a result, the S/N ratio of the bias current signal can be increased. Although the two driving lines G are simultaneously driven in the example of FIG. 17, a driving line group including an arbitrary number of (two or more) driving lines G may be driven. Unlike FIG. 17, the driving lines G to be driven simultaneously may be adjacent to each other. The radiation imaging apparatus 100 may be configured to be able to change the number of driving lines to be driven simultaneously in accordance with an input from the user. In this case, as the number of driving lines to be driven simultaneously increases, switching noise also increases, so the control unit 106 may switch the gain of the detection circuit 120 in accordance with the number of driving lines.

As described above, according to the embodiment, radiation information is acquired based on various driving timings, sampling cycles, and calculation equations. However, the present invention is not limited to the above-described embodiments. For example, the ON time TH may be longer than the OFF time TL. In one initialization operation, a plurality of effective values S and one noise value N may be sampled. The calculation unit 130 may calculate radiation information by using one or more of a plurality of effective values S obtained in one initialization operation and one or more of a plurality of noise values N. The calculation unit 130 need not calculate radiation information by using both the effective value S and noise value N, and may calculate radiation information by using a plurality of effective values S or calculate radiation information by using a plurality of noise values N. As described with reference to FIG. 5, the first signal of the bias current flows when the pixel array 101 is irradiated with radiation, regardless of the ON/OFF state of the switching element T. Therefore, the calculation unit 130 may calculate, as radiation information, the difference between an effective value S obtained when the pixel array 101 is irradiated with radiation, and a previously acquired effective value S obtained when the pixel array 101 is not irradiated with radiation. Similarly, the calculation unit 130 may calculate, as radiation information, the difference between a noise value N obtained when the pixel array 101 is irradiated with radiation, and a previously acquired noise value N obtained when the pixel array 101 is not irradiated with radiation. In general, the calculation unit 130 calculates radiation information based on sample values acquired a plurality of times for the bias current signal VSD supplied from the detection circuit 120. By comparing the radiation information with a threshold, the determination unit 131 can determine the presence/absence of irradiation with radiation. The weights on the effective value S and noise value N are not limited to values determined by the above-described methods. One or more effective values S and one or more noise values N may be multiplied by arbitrary weights, respectively.

Figure 18:
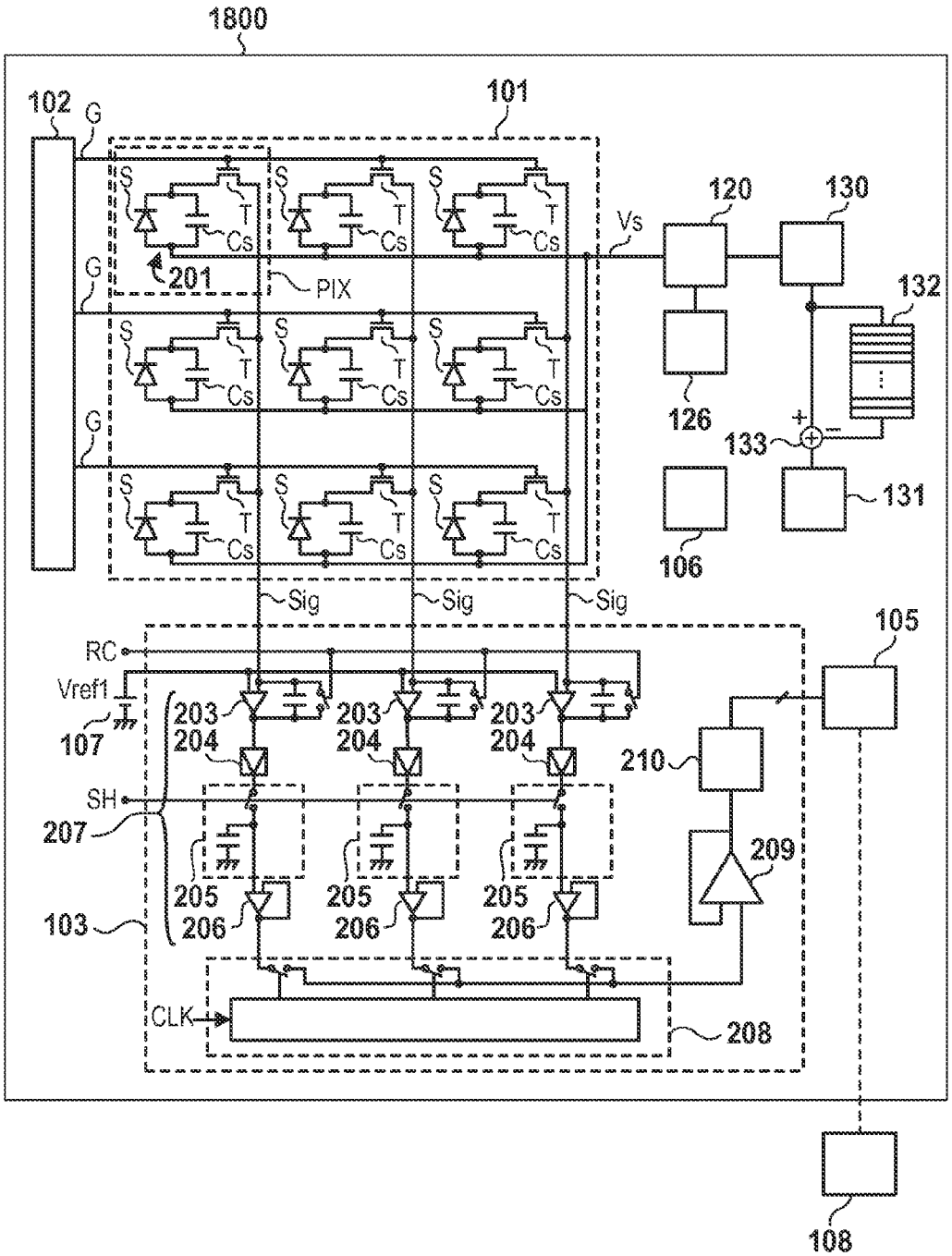
FIG. 18 is a circuit diagram for explaining an example of the arrangement of a radiation imaging apparatus according to some other embodiments.

The overall arrangement of a radiation imaging apparatus 1800 according to some other embodiments of the present invention will be described with reference to FIG. 18. The radiation imaging apparatus 1800 is different from the radiation imaging apparatus 100 of FIG. 1 in that it further includes a memory 132 and adder 133. The remaining arrangement can be the same as the embodiment of the radiation imaging apparatus 100, and a repetitive description thereof will be omitted.

The memory 132 can accumulate pieces of radiation information output from a calculation unit 130 for one frame (Y pieces of radiation information in the above-described example), and outputs them to the adder 133 by FIFO in the order of storage. The adder 133 subtracts radiation information output from the memory 132, from radiation information output from the calculation unit 130, and supplies the difference to a determination unit 131. For example, when the calculation unit 130 outputs radiation information X(y) obtained for the yth initialization operation, X(y)-X(y-Y) is supplied to the determination unit 131. That is, the difference from radiation information of an immediately preceding frame is supplied to the determination unit 131.

The present inventors have found out that the switching noise amount differs between the driving lines G, but the reproducibility is high for a single driving line G. For this reason, switching noise can be effectively reduced by subtracting radiation information obtained by driving a certain driving line G in advance, from radiation information obtained by driving the same driving line G, as described above. This will be called frame correction.

In the above-described example, radiation information of an immediately preceding frame is subtracted from the current radiation information. However, radiation information before k frames (k is 2 or more) may be subtracted, or the average (simple average or weighted average) of pieces of radiation information of a plurality of frames for the same driving line G may be subtracted. The memory 132 may be interposed not between the calculation unit 130 and the determination unit 131, but between a detection circuit 120 and the calculation unit 130, and subtraction may be performed at the stage of a bias current signal VSD supplied to the calculation unit 130. In this manner, when the difference is calculated between frames, switching noise can be effectively reduced by making constant the driving timing of the driving signal and the sample and hold timing of an A/D converter 340 for each frame. Thus, clocks may be supplied from a common clock generator to a driving circuit 102 and the A/D converter 340.

Figure 21:
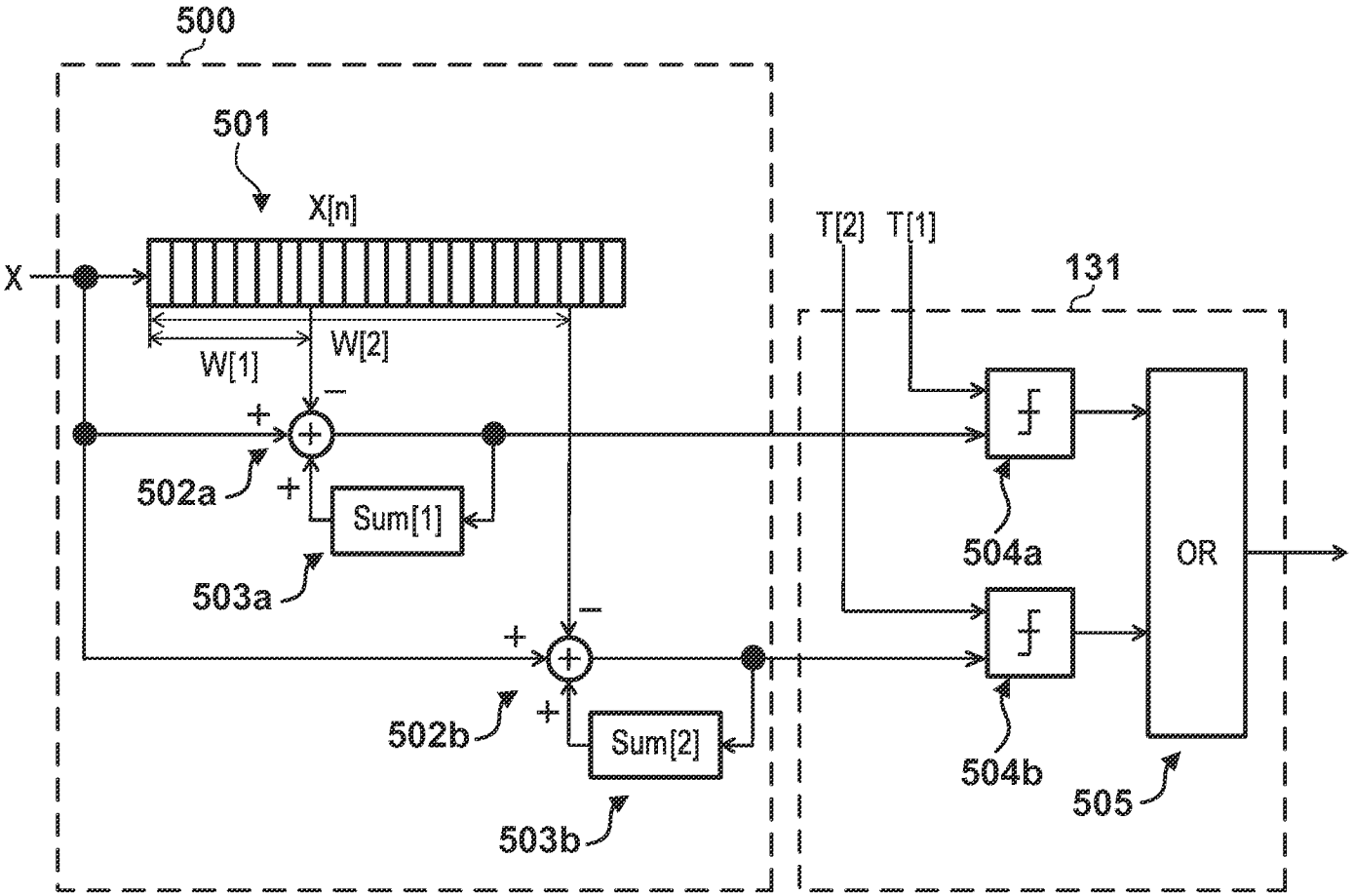
FIG. 21 is a circuit diagram for explaining an example of the arrangement of the integrating circuit of the radiation imaging apparatus in FIGS. 18.

The radiation imaging apparatus 1800 may include an integrating circuit 500 shown in FIG. 21 between the adder 133 and the determination unit 131. The integrating circuit 500 can include a shift register 501, adders 502a and 502b, and registers 503a and 503b which hold integral values. The determination unit 131 can include comparators 504a and 504b, and an OR circuit 505. In FIG. 21, X is the latest radiation information output from the adder 133.

First, a value X[n] stored in the shift register 501, and integral values Sum[m] held in the registers 503a and 503b are initialized. This will be called resetting of the integrator. Then, every time a clock (not shown) is supplied to the shift register 501, X[n] stored in the shift register 501 is shifted. That is, the shift register 501 performs processing given by:

$$X[n]=X[n-1](n>1)$$

$$X[n]=X(n=0)$$

Every time a clock (not shown) is supplied, the adders 502a and 502b, and the registers 503a and 503b which hold integral values perform cumulative addition (integration). That is, the adders 502a and 502b and the registers 503a and 503b perform processing given by:

$$Sum[m]=X+Sum[m]-X[W[m]]$$

The adder 502a and register 503a constitute one integrator, and the adder 502b and register 503b constitute another integrator.

For example, letting Xk be radiation information k clocks after resetting, the Sum[m] value for W[m]=4 changes as follows:

$$Sum[m]=0 \text{ (immediately after resetting)}$$

$$Sum[m]=X1 \text{ (k=1)}$$

$$Sum[m]=X2+X1 \text{ (k=2)}$$

$$Sum[m]=X3+X2+X1 \text{ (k=3)}$$

$$Sum[m]=X4+X3+X2+X1 \text{ (k=4)}$$

$$Sum[m]=X5+X4+X3+X2 \text{ (k=5)}$$

$$Sum[m]=X6+X5+X4+X3 \text{ (k=6)}$$

. . .

$$Sum[m]=XK+XK-1+XK-2+XK-3 \text{ (k=K)}$$

where Sum[m] is a value obtained by integrating the radiation information X in the integral interval W[m].

That is, the integral value can be calculated in an integral interval determined by the tap (readout position) of the shift register 501. Since calculation of the integral value is completed by one clock, the time taken to determine the start of irradiation can be greatly shortened.

By arranging M integrators as mentioned above, the mth integral value Sum[m] in the mth integral interval W[m] can be obtained (m=1 to M). Also, M comparators like the comparators 504a and 504b are also arranged. The comparator compares the mth integral value Sum[m] with the mth threshold T[m]. If Sum[m]>T[m] in any comparator, it can be determined by the OR circuit 505 that irradiation with radiation has started. If Sum[m] T[m] in all the comparators, it is determined that irradiation with radiation has not been performed.

In the arrangement example shown in FIG. 21, an adder and comparator are arranged for each register which holds an integral value. However, this is merely an example. For example, a plurality of registers may share one adder and one comparator. The shift register 501 can be constructed by a single block, but may be divided into a plurality of blocks. The plurality of blocks constructing the shift register 501 can be mounted in, for example, different memory segments on an FPGA. The arrangement shown in FIG. 21 may be implemented by software.

When radiation information or the integral value of radiation information exceeds a predetermined threshold, the determination unit 131 determines that irradiation with radiation has been performed. Also, an arrangement can be adopted, in which CDS is performed for the sum of a plurality of effective values S and the sum of a plurality of noise values N, as shown in FIG. 10. These calculations are not in particular order. However, to decrease the amount of data to process, it is also possible to perform signal processing in the order of addition, CDS, frame correction, and integration, and then perform comparison with a predetermined threshold.

Figure 19:
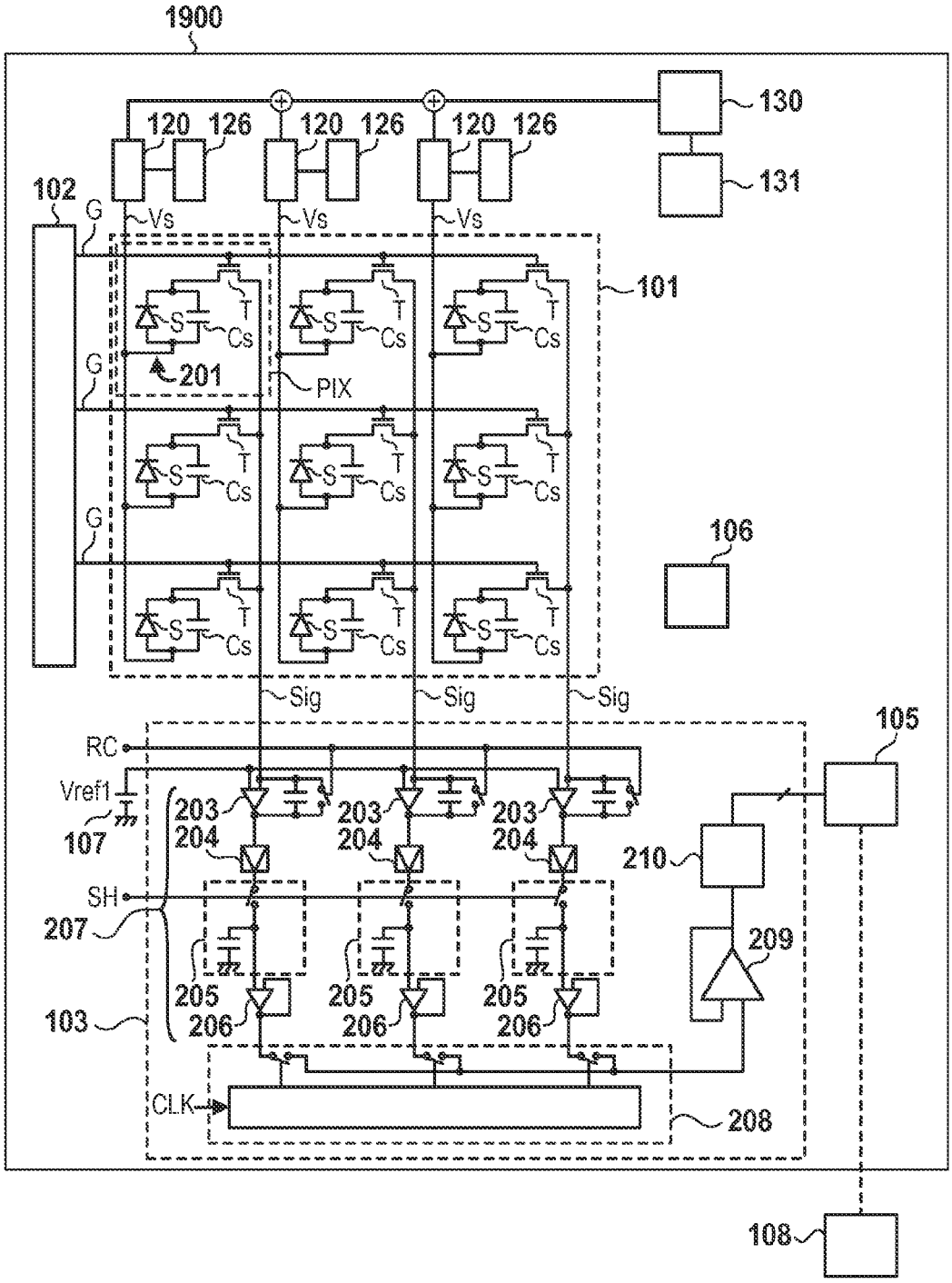
FIG. 19 is a circuit diagram for explaining an example of the arrangement of a radiation imaging apparatus according to some other embodiments.

The overall arrangement of a radiation imaging apparatus 1900 according to some other embodiments of the present invention will be described with reference to FIG. 19. The radiation imaging apparatus 1900 is different from the radiation imaging apparatus 100 of FIG. 1 in that a bias line Vs is arranged for each pixel column, and a plurality of detection circuits 120 and a plurality of reference bias potential generation circuits 126 are arranged. The detection circuit 120 and reference bias potential generation circuit 126 are arranged for one bias line Vs. The remaining arrangement can be the same as the embodiment of the radiation imaging apparatus 100, and a repetitive description thereof will be omitted. The radiation imaging apparatus 1900 may include a memory 132 between a calculation unit 130 and a determination unit 131, similar to the radiation imaging apparatus 1800. The radiation imaging apparatus 1900 may include the detection circuit 120 and reference bias potential generation circuit 126 for every two or more bias lines Vs, instead of including the detection circuit 120 and reference bias potential generation circuit 126 for every bias line Vs.

As described with reference to FIG. 14, the time until the second signal of the bias current peaks after the driving signal rises depends on the time constant of a portion of a driving line G that extends from a driving circuit 102 to a switching element T. In the embodiment, therefore, each bias line Vs is connected to pixels PIX which are equal in the length of a portion of the driving line G that extends from the driving circuit 102 to the switching element T, and which are aligned in the column direction. The detection circuit 120 and reference bias potential generation circuit 126 are arranged for each bias line Vs. In this case, the position of the peak of the second signal of the bias current may differ between the detection circuits 120. Thus, a delay time TD is determined by the above-described method for each detection circuit 120, and sampling is performed. Bias current signals VSD output from the respective detection circuits 120 are added to supply the sum to the calculation unit 130. Subsequent processing is the same as the embodiment of the radiation imaging apparatus 100, and a repetitive description thereof will be omitted. In this embodiment, the S/N ratio of the bias current signal can be further increased.

A radiation imaging apparatus according to some other embodiments of the present invention will be explained. The arrangement of the radiation imaging apparatus according to the embodiment can be the same as that of the radiation imaging apparatus according to any one of the above-described embodiments, and a radiation imaging apparatus 100 will be exemplified. In the embodiment, the radiation imaging apparatus 100 measures noise generated when irradiation with radiation is performed, and changes the operation settings of the radiation imaging apparatus 100 based on the noise amount. These operation settings can be settings about the radiation detection operation in FIG. 3, including the aforementioned ON time TH, OFF time TL, sampling cycle TS, equations for calculating radiation information, the number of driving lines G to be driven simultaneously, and a threshold to be compared with radiation information by a determination unit 131.

Figure 20:
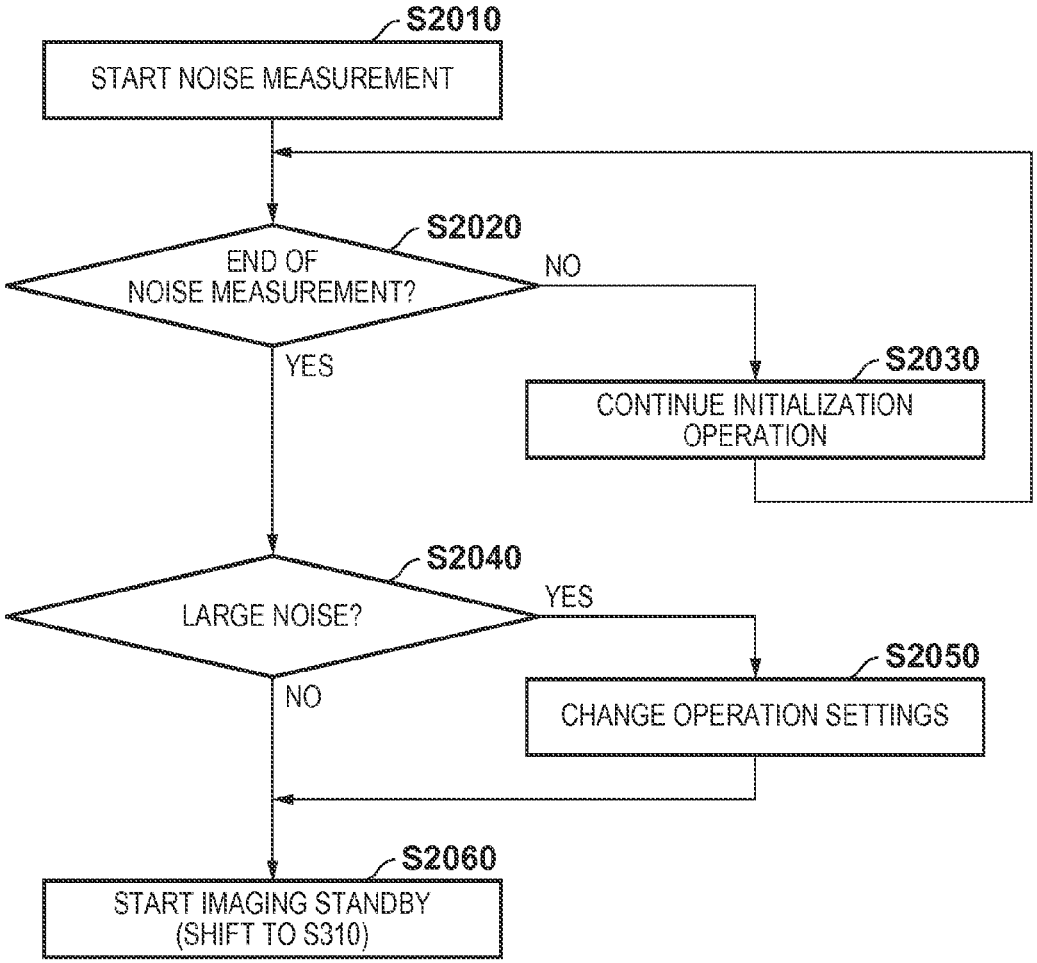
FIG. 20 is a flowchart for explaining an example of the operation of a radiation imaging apparatus according to some other embodiments.

An example of the operation of the radiation imaging apparatus 100 in the embodiment will be explained with reference to FIG. 20. In step S2010, a control unit 106 starts noise measurement. The control unit 106 may start noise measurement in response to an input from the user of the radiation imaging apparatus 100, or automatically start it after power-on of the radiation imaging apparatus 100.

In step S2020, the control unit 106 determines whether the noise measurement end condition has been satisfied. The noise measurement end condition may be the lapse of a predetermined time after the start of noise measurement, or acceptance of an input indicating the end from the user. If the noise measurement end condition has not been satisfied (NO in step S2020), the control unit 106 continues the initialization operation in step S2030. Although this initialization operation is the same as that in step S370 of FIG. 3, the determination unit 131 stores radiation information supplied from the calculation unit 130, instead of determining the presence/absence of irradiation with radiation. For example, the determination unit 131 can store the latest radiation information of one frame. Then, the process returns to step S2020, and the control unit 106 determines whether the noise measurement end condition has been satisfied.

If the noise measurement end condition has been satisfied (YES in step S2020), the control unit 106 determines in step S2040 whether radiation information stored in the determination unit 131 is larger than a predetermined value. In the noise determination processing of FIG. 20, the radiation imaging apparatus 100 is not irradiated with radiation, so the radiation information represents noise which remains even after the above-mentioned CDS operation. In this large noise state, the presence/absence of irradiation with radiation may not be normally determined even if the processing in FIG. 3 starts. For this reason, if the noise is larger than the predetermined value (YES in step S2040), the control unit 106 changes the operation settings in step S2050. For example, the control unit 106 may increase the threshold used by the determination unit 131 in step S320 for comparison with radiation information, or change the driving cycle of a driving circuit 102 to reduce the influence of external noise in accordance with the frequency characteristic of detected noise. If the noise is not larger than the predetermined value (NO in step S2040), the control unit 106 shifts to step S310 of FIG. 3, and starts the imaging standby start state. In this case, the control unit 106 may change the operation settings. For example, the control unit 106 may decrease the threshold used by the determination unit 131 in step S320 for comparison with radiation information.

After the operation settings are changed in step S2050, the process may further return to step S2020 to repeat noise measurement. If the noise value greatly exceeds the predetermined value in step S2040, the control unit 106 may present this result to the user. In this case, the control unit 106 may inhibit shift to the imaging standby state.

Figure 22:
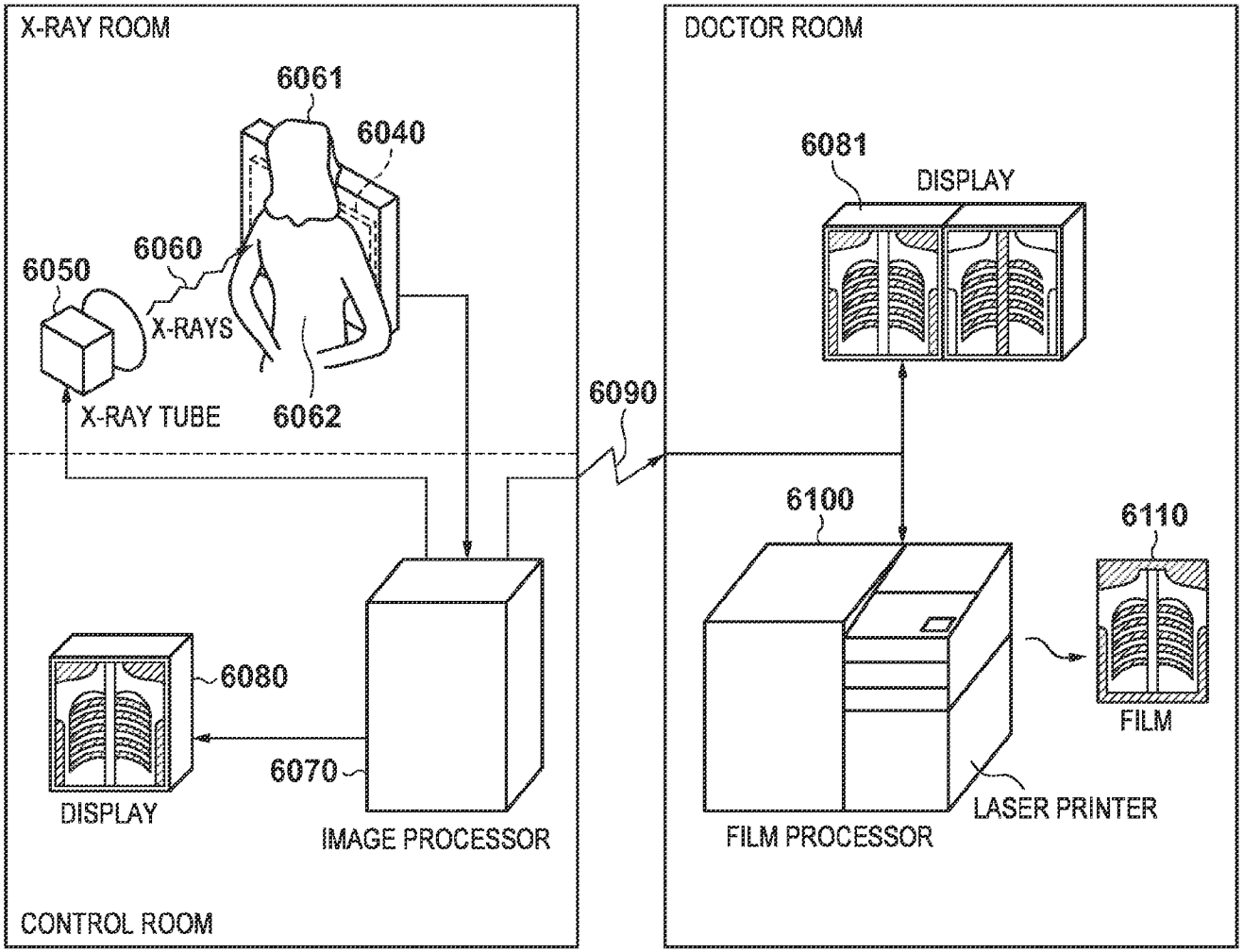
FIG. 22 is a view for explaining the arrangement of a radiation imaging system according to some other embodiments.

FIG. 22 is a view showing an example in which the radiation imaging apparatus according to the present invention is applied to an X-ray diagnostic system (radiation imaging system). The radiation imaging system includes a radiation imaging apparatus 6040 (corresponding to one of the radiation imaging apparatuses 100, 1800, and 1900), and an image processor 6070 which processes a signal output from the radiation imaging apparatus 6040. X-rays 6060 generated by an X-ray tube (radiation source) 6050 pass through a chest 6062 of a patient or object 6061 and enter the radiation imaging apparatus 6040. The incident X-rays include information about the inside of the body of the object 6061. The image processor (processor) 6070 processes a signal (image) output from the radiation imaging apparatus 6040, and can, for example, display an image on a display 6080 in a control room based on a signal obtained by the processing.

The image processor 6070 can transfer the signal obtained by the processing to a remote place via a transmission path 6090. Accordingly, the image can be displayed on a display 6081 installed in a doctor room or the like at another place, and the image can be recorded on a recording medium such as an optical disk. The recording medium can be a film 6110. In this case, a film processor 6100 records the image on the film 6110.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-040030, filed Feb. 28, 2013, which is hereby incorporated by reference herein in its entirety.

What is claimed is:

1. A radiation imaging apparatus comprising:

a pixel array having a plurality of pixels arranged in a plurality of rows and a plurality of columns, each pixel including a conversion element for accumulating charge in accordance with radiation and a switching element for connecting the conversion element to a signal line;

a bias line for supplying a bias potential to the conversion elements of the plurality of pixels;

a plurality of driving lines for supplying a driving signal to control the switching elements of the plurality of pixels;

a driving unit configured to supply a driving signal to the plurality of driving lines in units of one or more driving lines and repeat an initialization operation comprising switching each driving signal from an OFF voltage at which the switching element is turned off, to an ON voltage at which the switching element is turned on, and then returning the driving signal to the OFF voltage;

an acquisition unit configured to acquire an effective value and a noise value in each driving cycle, the driving cycle being a time duration from the time when a driving signal to particular one or more driving lines is switched to the ON voltage to the time when a driving signal to a next one or more driving lines is switched to the ON voltage, the effective value representing a current flowing through the bias line upon supply of the ON voltage to at least one of the plurality of driving lines, and the noise value representing a current flowing through the bias line upon supply of the OFF voltage to each of the plurality of driving lines;

a calculation unit configured to calculate radiation information based on the effective value and the noise value; and a determination unit configured to determine whether irradiation of said pixel array with radiation is present based on the calculated radiation information.

2. The apparatus according to claim 1, wherein said driving unit is configured to return the driving signal supplied to the particular one or more driving lines to the OFF voltage a time interval before switching the driving signal to the next one or more driving lines to the ON voltage.

3. The apparatus according to claim 1, wherein said calculation unit is configured to calculate the radiation information based on the effective value acquired in a particular driving cycle and at least one of the noise value acquired in the particular driving cycle and the noise value acquired in a driving cycle immediately preceding the particular driving cycle.

4. The apparatus according to claim 1, wherein said calculation unit is configured to calculate the radiation information based on a difference between a value calculated from at least one effective value and a value calculated from at least one noise value, and said determination unit is configured to make the determination by comparing the radiation information with a threshold.

5. The apparatus according to claim 4, wherein said acquisition unit is configured to acquire the noise value a plurality of times in each driving cycle, and said calculation unit is configured to calculate the value calculated from the at least one noise value, by weighting the plurality of noise values and adding the weighted noise values.

6. The apparatus according to claim 5, wherein weights for the plurality of noise values become smaller as the time when a noise value is acquired becomes farther in time from the time when the effective value is acquired.

7. The apparatus according to claim 4, wherein said acquisition unit is configured to acquire the effective value a plurality of times in each driving cycle, and said calculation unit is configured to calculate the value calculated from the at least one effective value, by weighting the plurality of effective values and adding the weighted effective values.

8. The apparatus according to claim 1, wherein said calculation unit is configured to calculate the radiation information based on the effective value and a noise value acquired a time interval after or before acquisition of the effective value.

9. The apparatus according to claim 1, wherein said driving unit is configured to switch, to the OFF voltage, the driving signal to the particular one or more driving lines, and at the same time switch, to the ON voltage, the driving signal to the next one or more driving lines, and said calculation unit is configured to calculate the radiation information based on the effective value acquired in a particular driving cycle and the effective value acquired in a driving cycle different from the particular driving cycle.

10. The apparatus according to claim 9, wherein said calculation unit is configured to calculate the radiation information based on the effective value acquired in a particular driving cycle and at least one of the effective value acquired in a driving cycle immediately after the particular driving cycle and the effective value acquired in a driving cycle immediately before the particular driving cycle.

11. The apparatus according to claim 1, wherein said calculation unit is configured to calculate the radiation information based on at least one signal value acquired by said acquisition unit upon lapse of a predetermined delay time after said driving unit switches, to the ON voltage, the driving signal to one or more driving lines and at least one signal value acquired after the acquisition of the at least one signal value.

12. The apparatus according to claim 11, wherein the predetermined delay time is determined based on at least one of a time constant of said one or more driving lines and a time constant of said bias line.

13. The apparatus according to claim 12, wherein the apparatus comprises a plurality of said bias lines and a plurality of said acquisition units arranged for said respective bias lines, and the predetermined delay time is determined for each acquisition unit.

14. The apparatus according to claim 1, further comprising a memory for storing the radiation information, wherein said determination unit is configured to determine whether irradiation of said pixel array with radiation is present based on a difference between the radiation information calculated in a particular driving cycle and radiation information which has been calculated in a driving cycle preceding the particular driving cycle for one or more driving lines to which the ON voltage has been supplied in the particular driving cycle and which has been stored in said memory.

15. The apparatus according to claim 1, wherein said acquisition unit includes an A/D converter, and the effective value includes a digital effective value obtained by sampling, by the A/D converter, an analog signal value representing a current flowing through said bias line.

16. The apparatus according to claim 1, wherein said driving unit is configured to supply the driving signal so that at least one driving line to which the ON voltage is supplied in a particular driving cycle and at least one driving line to which the ON voltage is supplied in a next driving cycle are not adjacent to each other.

17. The apparatus according to claim 1, wherein said driving unit sequentially switches, to the ON voltage, driving signals to odd-numbered driving lines as counted from one side of said pixel array, and then sequentially switches, to the ON voltage, driving signals to even-numbered driving lines as counted from the one side of said pixel array.

18. The apparatus according to claim 1, wherein said driving unit is configured to supply driving signal to the plurality of driving lines in units of two or more driving lines.

19. The apparatus according to claim 1, wherein said driving unit is configured to end switching of the driving signal to the ON voltage when said determination unit determines that said pixel array has been irradiated with radiation.

20. A radiation imaging system comprising:

a radiation imaging apparatus; and a processor for processing a signal output from said radiation imaging apparatus, wherein the radiation imaging apparatus comprises:

a pixel array having a plurality of pixels arranged in a plurality of rows and a plurality of columns, each pixel including a conversion element for accumulating charge in accordance with radiation and a switching element for connecting the conversion element to a signal line;

a bias line for supplying a bias potential to the conversion elements of the plurality of pixels;

a plurality of driving lines for supplying a driving signal to control the switching elements of the plurality of pixels;

a driving unit configured to supply a driving signal to the plurality of driving lines in units of one or more driving lines and repeat an initialization operation comprising switching each driving signal from an OFF voltage at which the switching element is turned off, to an ON voltage at which the switching element is turned on, and then returning the driving signal to the OFF voltage;

an acquisition unit configured to acquire an effective value and a noise value in each driving cycle, the driving cycle being a time duration from the time when a driving signal to particular one or more driving lines is switched to the ON voltage to the time when a driving signal to next one or more driving lines is switched to the ON voltage, the effective value representing a current flowing through the bias line upon supply of the ON voltage to at least one of the plurality of driving lines, and the noise value representing a current flowing through the bias line upon supply of the OFF voltage to each of the plurality of driving lines;

a calculation unit configured to calculate radiation information based on the effective value and the noise value; and a determination unit configured to determine whether irradiation of said pixel array with radiation is present based on the calculated radiation information.

*21. A radiation imaging apparatus comprising:*

*a pixel array having a plurality of pixels arranged in a plurality of rows and a plurality of columns, each pixel including a conversion element for accumulating charge in accordance with radiation and a switching element for connecting the conversion element to a signal line;*

*a bias line for supplying a bias potential to the conversion elements of the plurality of pixels;*

*a plurality of driving lines for supplying a driving signal to control the switching elements of the plurality of pixels;*

*a driving unit configured to supply a driving signal to the plurality of driving lines in units of one or more driving lines and repeat an initialization operation that is performed in each driving cycle, the initialization operation comprising switching each driving signal from an OFF voltage at which the switching element is turned off, to an ON voltage at which the switching element is turned on, and then returning the driving signal to the OFF voltage, the driving cycle being a time duration from the time when one driving signal to one of the units of one or more driving lines is switched to the ON voltage to the time when a next driving signal to another one of the units of one or more driving lines is switched to the ON voltage;*

*an acquisition unit configured to acquire an effective value and a noise value, the effective value representing a current flowing through the bias line upon supply of the ON voltage to at least one of the plurality of driving lines, and the noise value representing a current flowing through the bias line upon supply of the OFF voltage to each of the plurality of driving lines;*

*a calculation unit configured to calculate radiation information based on the effective value and the noise value; and*

*a determination unit configured to determine whether irradiation of said pixel array with radiation is present based on the calculated radiation information.*

*22. The apparatus according to claim 21, wherein said driving unit is configured to return the one driving signal to the OFF voltage a time interval before switching the next driving signal to the ON voltage,*

*said acquisition unit is configured to acquire at least one of the effective value and the noise value in each driving cycle, and*

*said calculation unit is configured to calculate the radiation information based on the effective value and the noise value.*

*23. The apparatus according to claim 22, wherein said calculation unit is configured to calculate the radiation information based on the effective value acquired in a particular driving cycle and at least one of the noise value acquired in the particular driving cycle and the noise value acquired in a driving cycle immediately preceding the particular driving cycle.*

*24. The apparatus according to claim 22, wherein said calculation unit is configured to calculate the radiation information based on the effective value acquired in a particular driving cycle and the noise value acquired in the particular driving cycle and the noise value acquired in a driving cycle immediately preceding the particular driving cycle.*

*25. The apparatus according to claim 22, wherein said calculation unit is configured to calculate the radiation information based on the effective value acquired in a particular driving cycle and the noise value acquired in the particular driving cycle.*

*26. The apparatus according to claim 22, wherein said calculation unit is configured to calculate the radiation information based on the effective value acquired in a*

*particular driving cycle and the noise value acquired in a driving cycle immediately preceding the particular driving cycle.*

*27. The apparatus according to claim 22, wherein said calculation unit is configured to calculate the radiation information based on a difference between a value calculated from at least one effective value and a value calculated from at least one noise value, and*

*said determination unit is configured to make the determination by comparing the radiation information with a threshold.*

*28. The apparatus according to claim 27, wherein said acquisition unit is configured to acquire the noise value a plurality of times in each driving cycle, and*

*said calculation unit is configured to calculate the value calculated from the at least one noise value, by weighting the plurality of noise values and adding the weighted noise values.*

*29. The apparatus according to claim 28, wherein weights for the plurality of noise values become smaller as the time when a noise value is acquired becomes farther in time from the time when the effective value is acquired.*

*30. The apparatus according to claim 27, wherein said acquisition unit is configured to acquire the effective value a plurality of times in each driving cycle, and*

*said calculation unit is configured to calculate the value calculated from the at least one effective value, by weighting the plurality of effective values and adding the weighted effective values.*

*31. The apparatus according to claim 21, wherein said calculation unit is configured to calculate the radiation information based on the effective value and a noise value acquired a time interval after or before acquisition of the effective value.*

*32. The apparatus according to claim 21, wherein said driving unit is configured to switch, to the OFF voltage, the one driving signal to the one of the units of one or more driving lines, and at the same time switch, to the ON voltage, the next driving signal to the another one of the units of one or more driving lines, and*

*said calculation unit is configured to calculate the radiation information based on the effective value acquired in a particular driving cycle and the effective value acquired in a driving cycle different from the particular driving cycle.*

*33. The apparatus according to claim 32, wherein said calculation unit is configured to calculate the radiation information based on the effective value acquired in a particular driving cycle and at least one of the effective value acquired in a driving cycle immediately after the particular driving cycle and the effective value acquired in a driving cycle immediately before the particular driving cycle.*

*34. The apparatus according to claim 21, wherein said calculation unit is configured to calculate the radiation information based on at least one signal value acquired by said acquisition unit upon lapse of a predetermined delay time after said driving unit switches, to the ON voltage, the driving signal to one or more driving lines and at least one signal value acquired after the acquisition of the at least one signal value.*

*35. The apparatus according to claim 34, wherein the predetermined delay time is determined based on at least one of a time constant of said one or more driving lines and a time constant of said bias line.*

*36. The apparatus according to claim 35, wherein the apparatus comprises a plurality of said bias lines and a plurality of said acquisition units arranged for said respective bias lines, and*

*the predetermined delay time is determined for each acquisition unit.*

*37. The apparatus according to claim 21, further comprising a memory for storing the radiation information, wherein said determination unit is configured to determine whether irradiation of said pixel array with radiation is present based on a difference between the radiation information calculated in a particular driving cycle and radiation information which has been calculated in a driving cycle preceding the particular driving cycle for one or more driving lines to which the ON voltage has been supplied in the particular driving cycle and which has been stored in said memory.*

*38. The apparatus according to claim 21, wherein said acquisition unit includes an A/D converter, and*

*the effective value includes a digital effective value obtained by sampling, by the A/D converter, an analog signal value representing a current flowing through said bias line.*

*39. The apparatus according to claim 21, wherein said driving unit is configured to supply the driving signal so that at least one driving line to which the ON voltage is supplied in a particular driving cycle and at least one driving line to which the ON voltage is supplied in a next driving cycle are not adjacent to each other.*

*40. The apparatus according to claim 21, wherein said driving unit sequentially switches, to the ON voltage, driving signals to odd-numbered driving lines as counted from one side of said pixel array, and then sequentially switches, to the ON voltage, driving signals to even-numbered driving lines as counted from the one side of said pixel array.*

*41. The apparatus according to claim 21, wherein said driving unit is configured to supply driving signal to the plurality of driving lines in units of two or more driving lines.*

*42. The apparatus according to claim 21, wherein said driving unit is configured to end switching of the driving signal to the ON voltage when said determination unit determines that said pixel array has been irradiated with radiation.*

*43. A radiation imaging system comprising:*

*a radiation imaging apparatus according to claim 21; and*

*a processor for processing a signal output from said radiation imaging apparatus.*

*44. A radiation imaging apparatus comprising:*

*a pixel array having a plurality of pixels arranged in a plurality of rows and a plurality of columns, each pixel including a conversion element for accumulating charge in accordance with radiation and a switching element for connecting the conversion element to a signal line;*

*a bias line for supplying a bias potential to the conversion elements of the plurality of pixels;*

*a plurality of driving lines for supplying a driving signal to control the switching elements of the plurality of pixels;*

*a driving unit configured to supply a driving signal to the plurality of driving lines in units of one or more driving lines and repeat an initialization operation comprising switching each driving signal from an OFF voltage at which the switching element is turned off, to an ON*

*voltage at which the switching element is turned on, and then returning the driving signal to the OFF voltage;*

*an acquisition unit configured to acquire an effective value and a noise value, the effective value representing a current flowing through the bias line upon supply of the ON voltage to at least one of the plurality of driving lines, and the noise value representing a current flowing through the bias line upon supply of the OFF voltage to each of the plurality of driving lines;*

*a calculation unit configured to calculate radiation information based on the effective value and the noise value; and*

*a determination unit configured to determine whether irradiation of said pixel array with radiation is present based on the calculated radiation information.*

*45. The apparatus according to claim 44, wherein said driving unit is configured to return one driving signal supplied to one of the units of one or more driving lines to the OFF voltage a time interval before switching a next driving signal to another one of the units of one or more driving lines to the ON voltage,*

*said acquisition unit is configured to acquire at least one of the effective value and the noise value in each driving cycle, the driving cycle being a time duration from the time when the one driving signal is switched to the ON voltage to the time when the next driving signal is switched to the ON voltage, and*

*said calculation unit is configured to calculate the radiation information based on the effective value and the noise value.*

*46. The apparatus according to claim 45, wherein said calculation unit is configured to calculate the radiation information based on the effective value acquired in a particular driving cycle and at least one of the noise value acquired in the particular driving cycle and the noise value acquired in a driving cycle immediately preceding the particular driving cycle.*

*47. The apparatus according to claim 45, wherein said calculation unit is configured to calculate the radiation information based on the effective value acquired in a particular driving cycle and the noise value acquired in the particular driving cycle and the noise value acquired in a driving cycle immediately preceding the particular driving cycle.*

*48. The apparatus according to claim 45, wherein said calculation unit is configured to calculate the radiation information based on the effective value acquired in a particular driving cycle and the noise value acquired in the particular driving cycle.*

*49. The apparatus according to claim 45, wherein said calculation unit is configured to calculate the radiation information based on the effective value acquired in a particular driving cycle and the noise value acquired in a driving cycle immediately preceding the particular driving cycle.*

*50. The apparatus according to claim 45, wherein said calculation unit is configured to calculate the radiation information based on a difference between a value calculated from at least one effective value and a value calculated from at least one noise value, and*

*said determination unit is configured to make the determination by comparing the radiation information with a threshold.*

*51. The apparatus according to claim 50, wherein said acquisition unit is configured to acquire the noise value a plurality of times in each driving cycle, and*

*said calculation unit is configured to calculate the value calculated from the at least one noise value, by weighting the plurality of noise values and adding the weighted noise values.*

*52. The apparatus according to claim 51, wherein weights for the plurality of noise values become smaller as the time when a noise value is acquired becomes farther in time from the time when the effective value is acquired.*

*53. The apparatus according to claim 50, wherein said acquisition unit is configured to acquire the effective value a plurality of times in each driving cycle, and*

*said calculation unit is configured to calculate the value calculated from the at least one effective value, by weighting the plurality of effective values and adding the weighted effective values.*

*54. The apparatus according to claim 45, wherein said calculation unit is configured to calculate the radiation information based on the effective value and a noise value acquired a time interval after or before acquisition of the effective value.*

*55. The apparatus according to claim 45, wherein said driving unit is configured to switch, to the OFF voltage, the one driving signal to the one of the units of one or more driving lines, and at the same time switch, to the ON voltage, the next driving signal to the another one of units of one or more driving lines, and*

*said calculation unit is configured to calculate the radiation information based on the effective value acquired in a particular driving cycle and the effective value acquired in a driving cycle different from the particular driving cycle.*

*56. The apparatus according to claim 55, wherein said calculation unit is configured to calculate the radiation information based on the effective value acquired in a particular driving cycle and at least one of the effective value acquired in a driving cycle immediately after the particular driving cycle and the effective value acquired in a driving cycle immediately before the particular driving cycle.*

*57. The apparatus according to claim 44, wherein said calculation unit is configured to calculate the radiation information based on at least one signal value acquired by said acquisition unit upon lapse of a predetermined delay time after said driving unit switches, to the ON voltage, the driving signal to one or more driving lines and at least one signal value acquired after the acquisition of the at least one signal value.*

*58. The apparatus according to claim 57, wherein the predetermined delay time is determined based on at least one of a time constant of said one or more driving lines and a time constant of said bias line.*

*59. The apparatus according to claim 58, wherein the apparatus comprises a plurality of said bias lines and a plurality of said acquisition units arranged for said respective bias lines, and*

*the predetermined delay time is determined for each acquisition unit.*

*60. The apparatus according to claim 44, further comprising a memory for storing the radiation information, wherein said determination unit is configured to determine whether irradiation of said pixel array with radiation is present based on a difference between the radiation information calculated in a particular driving cycle, the particular driving cycle being a time duration from the time when a driving signal to a particular one or more driving lines is switched to the ON voltage to the time when a driving signal to another one or more driving lines is switched to the ON*

*voltage next to the one of the units of one or more driving lines, and radiation information which has been calculated in a driving cycle preceding the particular driving cycle for one or more driving lines to which the ON voltage has been supplied in the particular driving cycle and which has been stored in said memory.*

*61. The apparatus according to claim 44, wherein said acquisition unit includes an A/D converter, and*

*the effective value includes a digital effective value obtained by sampling, by the A/D converter, an analog signal value representing a current flowing through said bias line.*

*62. The apparatus according to claim 44, wherein said driving unit is configured to supply the driving signal so that at least one driving line to which the ON voltage is supplied in a particular driving cycle, the particular driving cycle being a time duration from the time when a driving signal to a particular one or more driving lines is switched to the ON voltage to the time when a driving signal to another one or more driving lines is switched to the ON voltage next to the one of the units of one or more driving lines, and at least one driving line to which the ON voltage is supplied in a next driving cycle are not adjacent to each other.*

*63. The apparatus according to claim 44, wherein said driving unit sequentially switches, to the ON voltage, driving signals to odd-numbered driving lines as counted from one side of said pixel array, and then sequentially switches, to the ON voltage, driving signals to even-numbered driving lines as counted from the one side of said pixel array.*

*64. The apparatus according to claim 44, wherein said driving unit is configured to supply driving signal to the plurality of driving lines in units of two or more driving lines.*

*65. The apparatus according to claim 44, wherein said driving unit is configured to end switching of the driving signal to the ON voltage when said determination unit determines that said pixel array has been irradiated with radiation.*

*66. A radiation imaging system comprising:*

*a radiation imaging apparatus according to claim 44; and*

*a processor for processing a signal output from said radiation imaging apparatus.*

* * * * *